United States Patent
Okubo et al.

(10) Patent No.: US 7,432,608 B2
(45) Date of Patent: Oct. 7, 2008

(54) GENERATOR AND POWER SUPPLY FOR USE THEREIN

(75) Inventors: Kazuo Okubo, Ise (JP); Kazumichi Kato, Ise (JP); Yuzo Takakado, Ise (JP); Hirosuke Imabayashi, Ise (JP); Toshio Miki, Ise (JP); Masami Morita, Ise (JP); Hideki Tamura, Ise (JP); Katsuyoshi Nakano, Ise (JP); Yushi Sato, Ise (JP); Tomoyuki Matsunaga, Ise (JP); Tetsuyuki Kimura, Ise (JP); Nobuhiro Saito, Ise (JP); Tetsunari Kobayakawa, Ise (JP); Kenji Yamaguchi, Ise (JP)

(73) Assignee: Shinko Electric Co., Ltd., Tokyo (JP)

( * ) Notice: Subject to any disclaimer, the term of this patent is extended or adjusted under 35 U.S.C. 154(b) by 276 days.

(21) Appl. No.: 10/489,313

(22) PCT Filed: Jan. 7, 2004

(86) PCT No.: PCT/JP2004/000050

§ 371 (c)(1),
(2), (4) Date: Nov. 17, 2005

(87) PCT Pub. No.: WO2004/109101

PCT Pub. Date: Dec. 16, 2004

(65) Prior Publication Data

US 2006/0145668 A1 Jul. 6, 2006

(30) Foreign Application Priority Data

| Jun. 9, 2003 | (JP) | 2003-164266 |
| Jul. 15, 2003 | (JP) | 2003-196964 |
| Oct. 24, 2003 | (JP) | 2003-364196 |
| Oct. 24, 2003 | (JP) | 2003-364197 |
| Oct. 24, 2003 | (JP) | 2003-365032 |
| Oct. 24, 2003 | (JP) | 2003-365033 |

(51) Int. Cl.
*B23K 9/10* (2006.01)
*F02N 15/06* (2006.01)

(52) U.S. Cl. .......................... 290/38 R; 290/1 E; 74/6; 475/5

(58) Field of Classification Search ................. 290/1 R, 290/1 C, 1 E, 5, 38 R, 45, 39, 30 R; 74/7 R, 74/6; 475/5
See application file for complete search history.

(56) References Cited

U.S. PATENT DOCUMENTS 2,354,290 A * 7/1944 Dermond .................. 290/38 A
2,575,442 A * 11/1951 Cooley ........................ 346/138

(Continued)

FOREIGN PATENT DOCUMENTS

JP 59-77082 5/1984

(Continued)

*Primary Examiner*—Nicholas Ponomarenko
(74) *Attorney, Agent, or Firm*—Oblon, Spivak, McClelland, Maier & Neustadt, P.C.

(57) ABSTRACT

The present invention provides an electric generator for achieving the cost reduction of the electric generator itself from the view point of the structure of the electric generator, and the cost reduction of the generation of electricity from the view point of the performance of the electric generator, and a power supply equipment for use in this electric generator.

4 Claims, 14 Drawing Sheets

U.S. PATENT DOCUMENTS

| | | | | |
|---|---|---|---|---|
| 4,042,088 A | * | 8/1977 | Schmohe | 192/114 R |
| 4,073,198 A | * | 2/1978 | Ford | 74/360 |
| 4,415,812 A | * | 11/1983 | Griffith et al. | 290/38 R |
| 4,738,148 A | * | 4/1988 | Norton | 74/7 R |
| 6,551,210 B2 | * | 4/2003 | Miller | 475/189 |
| 6,638,193 B2 | * | 10/2003 | Hamai | 475/5 |
| 7,384,370 B2 | * | 6/2008 | Miller | 476/37 |

FOREIGN PATENT DOCUMENTS

| | | |
|---|---|---|
| JP | 59-138781 | 8/1984 |
| JP | 60-002047 | 1/1985 |
| JP | 2001-161052 | 6/2001 |
| JP | 2002-315395 | 10/2002 |
| JP | 2002-327678 | 11/2002 |
| JP | 2003-56446 | 2/2003 |
| JP | 2003-56451 | 2/2003 |
| RU | 2 094 269 C1 | 10/1997 |
| RU | 2 157 466 C1 | 10/2000 |
| RU | 2 173 280 C2 | 9/2001 |
| SU | 393504 | 8/1973 |
| SU | 404168 | 10/1973 |
| SU | 898554 | 1/1982 |

\* cited by examiner

B-B　　　　　C-C　　　　　D-D

GENERATOR AND POWER SUPPLY FOR USE THEREIN

TECHNICAL FIELD

The present invention is related to an electric generator for converting a natural energy such as wind power energy into an electric energy as an electric power for driving a variety of apparatuses and a power supply equipment for use in the electric generator.

BACKGROUND OF THE INVENTION

The generation of electricity by the use of natural energy such as wind power and water power becomes popular instead of the generation of electricity by the use of the burning of coal, oil and so forth which is a factor of environmental warming and disruption. For example, a wind power electric generator making use of wind power is composed of a control unit for controlling the rotation of a windmill, an electric dynamo for generating power by converting the rotation force of the windmill into electrical energy and other necessary components, and serves to supply electric power for example for use in home by rotating the windmill and converting the rotation force thereof into electrical energy. This electric dynamo includes a rotator fixed to a rotatable shaft which rotates by the use of natural energy, a stator located opposite this rotator, and a housing to which the stator is fixed. An induction current is generated between the permanent magnet of the rotator and the magnetic pole of the stator core by the rotation of the rotatable shaft. However, there are a variety of problems in this type of electric generators.

It is a main object of the present invention to provide an electric generator with which cost reduction is possible by overcoming the various problems. The above object includes the cost reduction of the electric generator itself from the view point of the structure of the electric generator, and the cost reduction of the generation of electricity from the view point of the performance of the electric generator.

More specifically, the first object is to reduce costs by solving the difficulties in assembling an electric generator resulting from the centering required of the input shaft in the torque generating side relative to the output shaft to which the rotator is fixed. It is difficult to change the output shaft of an electric generator from its resting state to its rotating state due to the attractive force between the stator and the rotator and the inertial force of the rotator. Accordingly, there is a problem that the generation of electricity cannot be started with the output shaft being in its resting state, unless a large torque is available. In order to overcome such a problem, an electric generator has been developed in which a clutch is provided between the input shaft and the output shaft (for example, as described in Japanese Patent Published Application No. Hei 8-312523). However, in the case of the electric generator as described in the patent publication 1, there is a problem that the cost rises due to the so-called centering step, required during assembling, for aligning the input shaft of the input shaft in the torque generating side with the axis of the output shaft to which the rotator is fixed. Also, since the input shaft and the output shaft are separate parts, the cost furthermore rises.

The second object is to reduce costs by solving the difficulties in assembling an electric generator resulting from the heavy weight of the stator. The stator must be heavy because it is located opposed to the rotator. The larger the size of the stator, the heavier the weight. Furthermore, if the weight of the stator increases, it becomes difficult to wind coils inside of the cylindrical stator.

The third object is to improve the performance of an electric generator by solving the problem that the rotation of the rotatable shaft becomes unstable because of the use of natural energy, and thereby to achieve the cost reduction of the generation of electricity.

The fourth object is to improve the performance of an electric generator by solving the problem that the rotation of the windmill cannot be controlled due to a failure, and thereby to achieve the cost reduction of the generation of electricity. For example, there is proposed an electric generator provided with a sensor serving to detect an object which is entering in the vicinity of the electric generator and halt the rotation of the windmill to ensure the safety (as described in Japanese Patent Published Application No. Hei 2003-21046). However, in the case of such an electric generator, the windmill cannot be stopped when the electric generator itself breaks down due to the breakage of a parts resulting in the failure of the sensor operation and the like. Furthermore, since the rotation of the windmill cannot be controlled because of the failure, when the windmill swiftly rotates by a strong wind such as a typhoon, there is a danger that a parts of the windmill will be blown off.

The fifth object is to improve the performance of an electric generator by avoiding the decrease in the charging efficiency of a battery when the available natural energy is low (for example, in the case of a weak wind), and thereby to achieve the cost reduction of the generation of electricity. The wind power electric generator serves to convert the kinetic energy of wind power into an electric energy of electric power in the form of three phase alternating currents, and rectify the phase voltages as output from output lines with three phases to provide a charging voltage for charging a battery and an electric power source for various devices. However, during battery charging, the charging voltage undergoes a lot of changes due to the variation of wind power.

The present invention is invented taking into consideration the above circumstances. It is an object of the present invention to provide an electric generator for achieving the cost reduction of the electric generator itself from the view point of the structure of the electric generator, and the cost reduction of the generation of electricity from the view point of the performance of the electric generator, and a power supply equipment for use in this electric generator.

DISCLOSURE OF THE INVENTION

In accordance with the present invention, the following features are provided respectively alone or in an appropriate combination. In order to solve the problem as described above, an electric generator according to the present invention comprises: a rotatable shaft coupled to a torque generating side; a rotator rotatably connected to said rotatable shaft; a clutch provided between said rotatable shaft and said rotator; a housing for containing said rotatable shaft, said rotator and said clutch; and a stator fixed to said housing and located opposed to said rotator. In accordance with this electric generator, the rotator is rotatably connected to the rotatable shaft which is in turn rotatably coupled to the torque generating side, and therefore it is no longer required to provide separate parts such as an input shaft and an output shaft and to perform the centering step thereof, resulting in cost reduction. Also, since the assembling process becomes easy, the cost can be furthermore reduced.

Alternatively, the electric generator in accordance with the present invention comprises: a rotatable shaft; a rotator connected to said rotatable shaft; a stator core fragmented into three or more in the peripheral direction; a pair of support members for rotatably supporting said rotatable shaft at positions in opposite sides of said rotator; and three or more support posts for connecting between the pair of these support members and engaging said stator core and fitted to the outer peripheral surface of said stator core. By this configuration, since the stator core is divided, each fragment of the stator core becomes light weight to facilitate the assembling. Furthermore, it is easy to wind a coil around the stator core. Still further, since a cylindrical housing can be dispensed with, weight saving is possible.

Alternatively, the electric generator in accordance with the present invention has a rotatable shaft and a blade fixed to said rotatable shaft in the peripheral direction, and comprises: a conductive member provided for the entirety or part of said blade; and a speed reduction unit having a magnet member relocatable to adjust the distance between the conductive member and the magnet member. By this configuration, it is possible to protect the electric generator by inhibiting the rotation of the rotatable shaft, for example, in case of a storm wind to avoid an excessive rotation and the occurrence of damage.

Alternatively, the electric generator in accordance with the present invention comprises: a driving power generating unit configured to convert a natural energy into a kinetic energy to generate a driving power; an electricity generating unit that operates with the driving power of said driving power generating unit to generate electricity; and a short-circuiting unit provided at the output of said electricity generating unit and configured to short-circuit the output of said electricity generating unit. By this configuration, it is possible to stop the driving power generating unit by short-circuiting the output of the electricity generating unit in an unusual situation. It is therefore possible to avoid a danger of losing control of the driving power generating unit. For example, in the case where a windmill is rotated by wind power, which is a form of natural energy, to generate electricity by the rotational energy of the windmill, the rotation of the windmill is stopped in an unusual situation, and therefore it is possible to avoid the windmill breaks down, resulting, for example, in a danger that a parts of the windmill will be blown off.

Alternatively, the electric generator in accordance with the present invention comprises: an electricity generating unit that converts a natural energy into an electric energy to output said electric energy as an electric power in the form of three phase alternating currents; a rectifier for rectifying and outputting the phase currents from said electricity generating unit; a pair of charge capacitors provided at the output of said rectifier and connected in parallel with said rectifier and in series with each other; and a neutral line connected to the intermediate point connecting the neutral point of said electricity generating unit with the intermediate point between said charge capacitors. By this configuration, the rectified voltage after rectification can be obtained as a line voltage which is twice the phase voltage relative to the neutral point of the three-phase alternating currents, and therefore an electric power can be generated with a high voltage higher than that in the case of the circuit configuration in which only the output lines of the three phase alternating currents are used to obtain the rectified voltage after rectification as a line voltage which is $\sqrt{3}$ times the phase voltage. As a result, it can be used even in the environment where only small natural energy is available.

BEST MODE FOR CARRYING OUT THE INVENTION

In what follows, a wind power electric generator according to an embodiment of the present invention will be specifically explained while the present invention is not limited to the embodiment.

Figure 1:
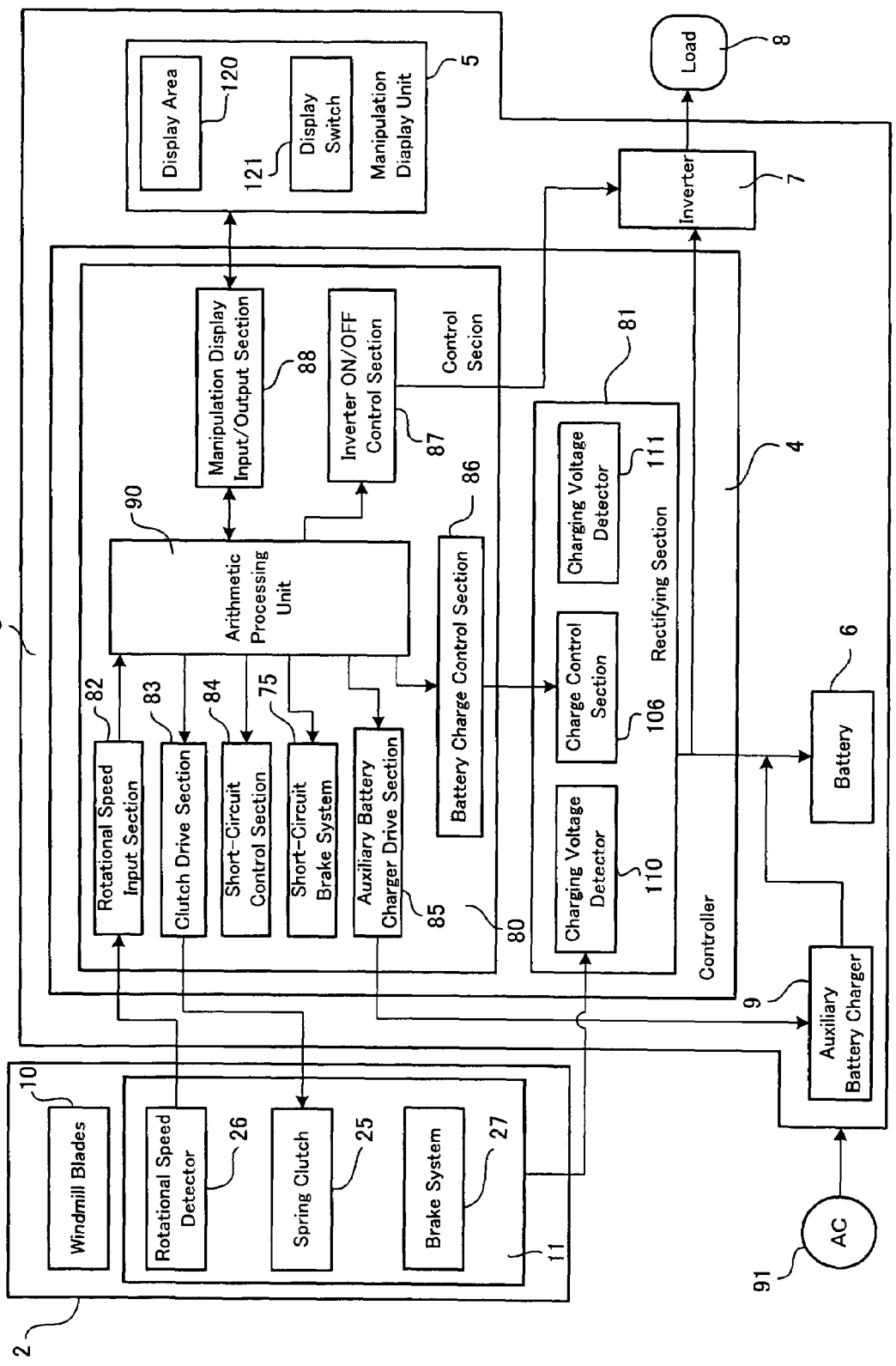
FIG. 1 is a block diagram showing a wind power electric generator according to a preferred embodiment of the present invention.

FIG. 1 is a block diagram showing the wind power electric generator according to the preferred embodiment of the present invention. In FIG. 1, the wind power electric generator 1 according to the present embodiment is a vertical axis type wind power electric generator comprising a wind power electric generator main body 2 for outputting an AC power by converting wind power energy as a form of natural energy into electric energy, and a power supply equipment 3 for controlling the wind power electric generator main body 2 and displaying the setting thereof.

Figure 2:
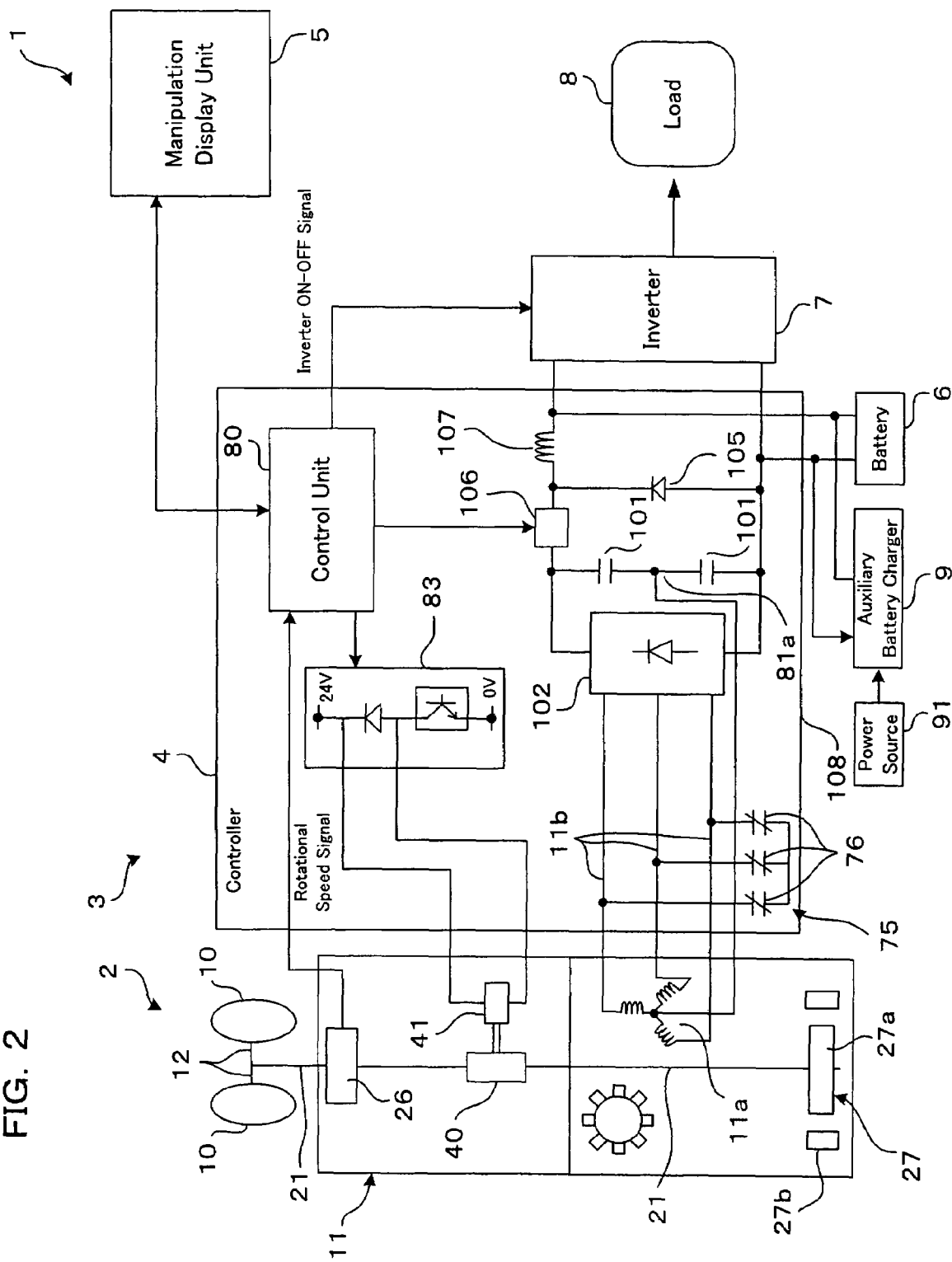
FIG. 2 is a view showing the overall configuration of the wind power electric generator according to the preferred embodiment of the present invention.
Figure 3:
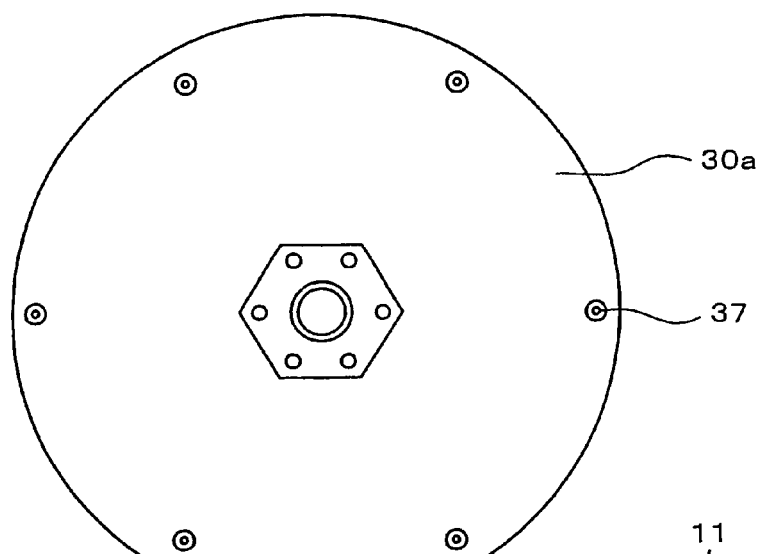
FIG. 3(a) is a plan view showing an electric dynamo for use in the wind power electric generator in accordance with the preferred embodiment of the present invention.
FIG. 3(b) is a vertical cross sectional view showing the electric dynamo as shown in FIG. 3(a).
Figure 3:
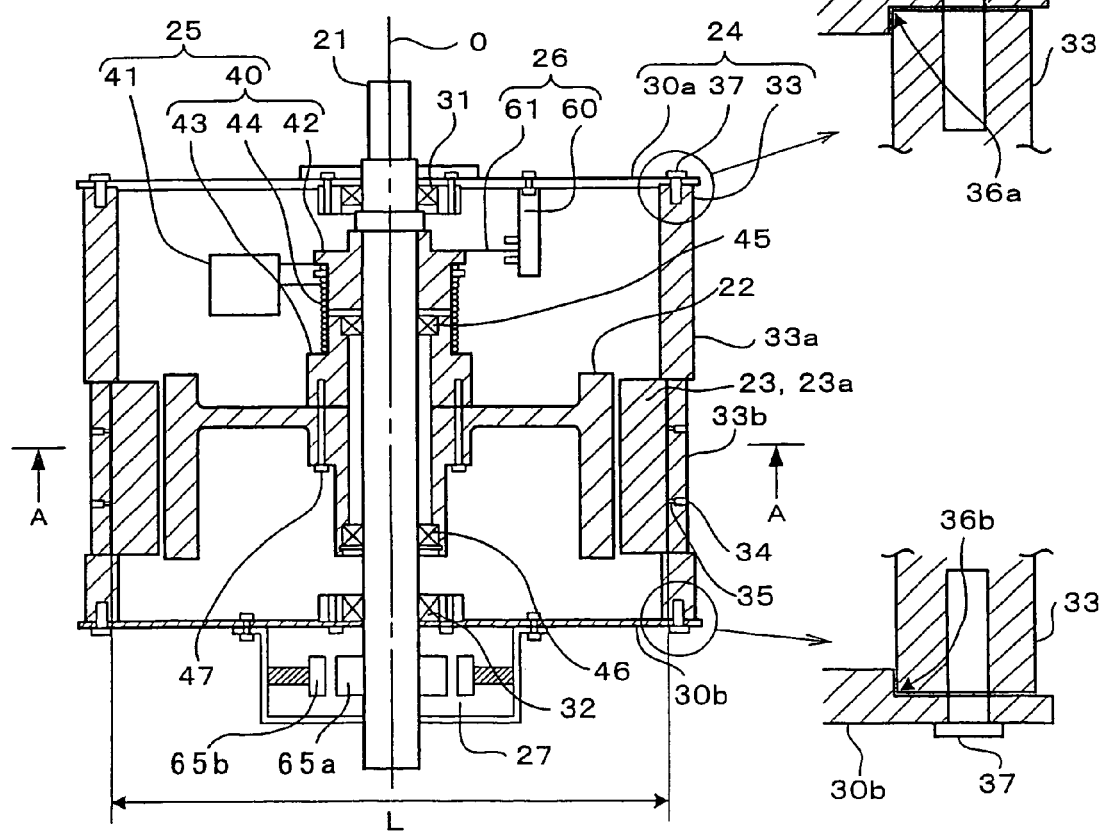

Wind Power Generator Main Body:

First, the wind power electric generator main body 2 will be explained with reference to FIG. 2 and FIG. 3. In the figures, FIG. 2 is a schematic diagram showing the overall configuration of the wind power electric generator in accordance with the preferred embodiment of the present invention; FIG. 3(*a*) is a plan view showing an electric dynamo for use in the wind power electric generator in accordance with the preferred embodiment of the present invention; and FIG. 3(*b*) is a vertical cross sectional view showing the electric dynamo as shown in FIG. 3(*a*). The above wind power electric generator main body 2 is provided with a plurality of windmill blades 10 catching the wind, and an electric dynamo 11 as shown in FIG. 2.

In FIG. 2, the windmill blades 10 are mounted on supporting members 12 fixed to a rotatable shaft 21 to be hereinafter described. A plurality of the supporting members 12 are arranged on the upper portion of the rotatable shaft 21 in the direction perpendicular to the axial direction of the rotatable shaft 21. Accordingly, the same number of the windmill blades 10 are provided as the supporting members 12.

In FIG. 3, the electric dynamo 11 is composed of, as main components, the rotatable shaft 21, a rotator 22, a stator 23, a housing 24, a spring clutch 25, a rotational speed detector 26 for detecting the rotational speed of the rotatable shaft 21, a brake system 27 for braking the rotation of the rotatable shaft 21.

The rotatable shaft 21 is rotatably supported by shaft bearings 31 and 32 fixed to a pair of support plates 30*a* and 30*b* to be hereinafter described to rotate in a predetermined direction when the windmill blades 10 catch the wind.

The rotator 22 includes a cylindrical member having a hollow and nearly T-shaped extensions projected from and approximately normal to the outer peripheral surface of the cylindrical member. The hollow of the rotator 22 as described above is designed to allow insertion of the rotatable shaft 21. With the rotatable shaft 21 inserted through the hollow, the rotator 22 is supported by the rotatable shaft 21 through the shaft bearings 45 and 46 in order to freely rotate in relation to the rotatable shaft 21. By designing the profile of the rotator 22, it is possible to reduce the moment of inertia exerted when starting rotation from a resting state. However, the profile of the rotator 22 is not limited thereto. Namely, it is only required that the rotator 22 and the stator 23 to be hereinafter described are located opposite each other to generate an induction current when the rotatable shaft 21 rotates.

Figure 4:
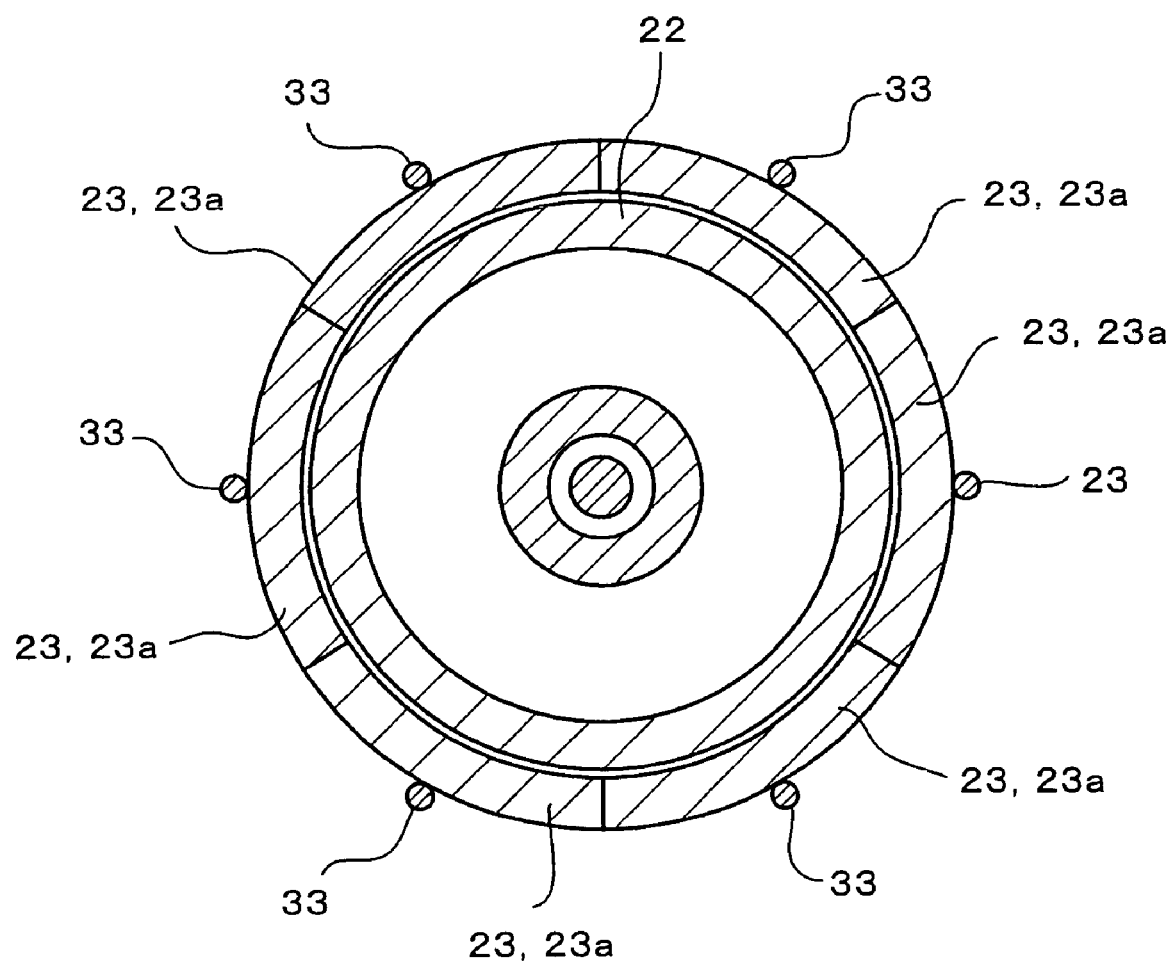
FIG. 4 is a cross sectional view along the line A-A of FIG. 3(b) showing the wind power electric generator in accordance with the preferred embodiment of the present invention.

Next, the stator 23 will be explained with reference to FIG. 4. In the figures, FIG. 4 is a cross sectional view along the line A-A of FIG. 3(*b*) showing the wind power electric generator in accordance with the preferred embodiment of the present invention. The stator 23 is a stator core 23*a* comprising an iron core on whose inside surface coils are wound. The stator core 23*a* is formed with a circular outer peripheral surface in the form of a cylinder. The stator core 23*a* in accordance with the present embodiment is divided nearly evenly into six fragments in the peripheral direction of the cylindrical shape. And, the respective fragments of the stator core 23*a* are located opposed to the above rotator 22 as illustrated in FIG. 3 and FIG. 4.

When the stator core 23*a* is divided in this manner, the weight of each fragment of the stator core 23*a* is small so that it is easy to assemble. Furthermore, the assembling is by far easy by winding a coil on each fragment of the stator core 23*a* as compared to winding a coil on the cylindrical stator core 23*a* not fragmented.

Next, returning to FIG. 3, the housing 24 will be explained. The housing 24 includes a pair of the support plates 30*a* and 30*b* and six support posts 33 whose opposite ends are fixed to the pair of support plates 30*a* and 30*b* with bolts 37.

The pair of support plates 30*a* and 30*b* serve to rotatably support the rotatable shaft 21 relative to the pair of support plates 30*a* and 30*b* through the shaft bearings 31 and 32 in order that the rotator 22 is vertically located between the pair of support plates 30*a* and 30*b*.

Each support post 33 is arranged to engage each fragment of the stator core 23*a* as divided at the center of the outer peripheral surface of the fragment of the stator core 23*a* in the peripheral direction. Namely, one support post 33 is provided for each fragment of the stator core 23*a*.

Next, the profile of the support posts 33 will be explained with reference to FIG. 3. In FIG. 3, each support post 33 is provided with steps between large diameter portions 33*a* and a small diameter portion 33*b* having a diameter slightly smaller than the large diameter portion 33*a*. The small diameter portions 33*b* of the support posts 33 engage the fragments of the stator core 23*a* respectively. Incidentally, when the electric dynamo 11 is assembled with the small diameter portions 33*b* of the support posts 33 engaging the fragments of the stator core 23*a* respectively, the stator 23 and the rotator 22 are located opposed to each other and therefore it is easy to assemble the electric dynamo 11.

Figure 5:
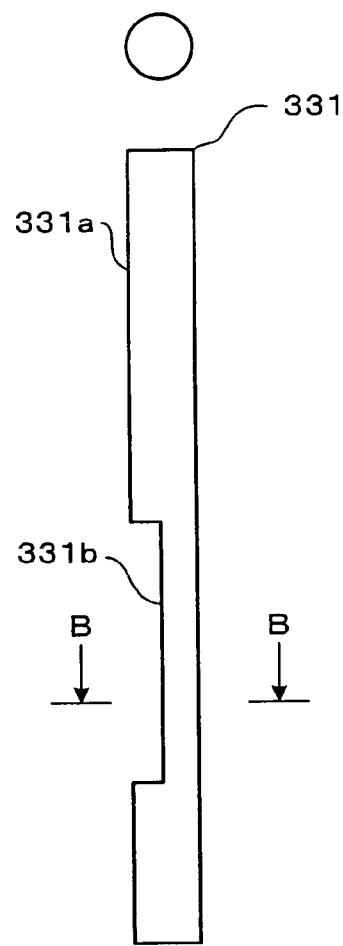
FIG. 5 shows exemplary modifications of the profile of a support post for use in the wind power electric generator in accordance with the preferred embodiment of the present invention.
Figure 5:
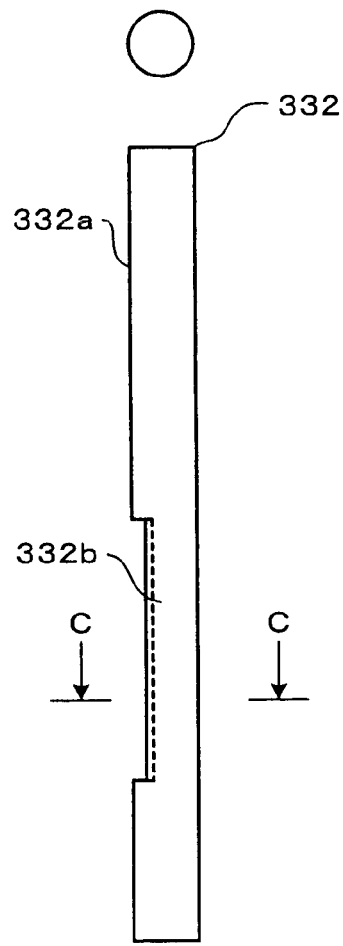
Figure 5:
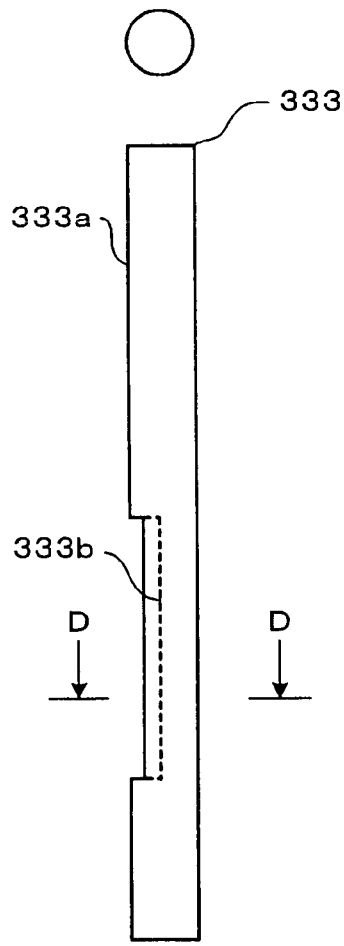
Figure 5:
Figure 5:
Figure 5:

While each support post 33 is provided with the steps between the large diameter portions 33*a* and the small diameter portion 33*b* having a diameter slightly smaller than the large diameter portion 33*a* in the case of the present embodiment, the present invention is not limited to this fashion. For example, the support post 33 may have any profile as illustrated in FIGS. 5(*a*) to (*c*). Meanwhile, FIG. 5 shows exemplary modifications of the profile of the support post for use in the wind power electric generator in accordance with the preferred embodiment of the present invention. The profiles of the support posts 331 to 333 as illustrated in FIGS. 5(*a*) to (*c*) will be explained in the following description.

In the case of the support post 331 as illustrated in FIG. 5(*a*), while the portions 331*a* which do not engage a fragment of the stator core 23*a* are cylindrical, the fitting portion (corresponding to the small diameter portion 33*b*) to engage a fragment of the stator core 23*a* is linearly cut as a linear cut portion 331*b*. The strength of this support post 331 is somewhat improved as compared to the support post 33 having the small diameter fitting portion to engage a fragment of the stator core 23*a*.

In the case of the support post 332 as illustrated in FIG. 5(*b*), while the portions 332*a* which do not engage a fragment of the stator core 23*a* are cylindrical, the fitting portion (corresponding to the small diameter portion 33*b*) to engage a fragment of the stator core 23*a* is cut along a circular curve as an arc cut portion 332*b*. When a fragment of the stator core 23*a* is fixed to this support post 332, there is a large area where the fragment of the stator core 23*a* engages the fitting portion and therefore the fragment of the stator core 23*a* can surely be fixed to the support post 332.

In the case of the support post 333 as illustrated in FIG. 5(*c*), while the portions 33*a* which do not engage a fragment of the stator core 23*a* are cylindrical, the fitting portion (corresponding to the small diameter portion 33*b*) to engage a fragment of the stator core 23a is cut along a trapezoidal curve to form an angular cut portion 333b. When a fragment of the stator core 23a is fixed to this support post 333, the fragment of the stator core 23a can surely be fixed to the support post 333.

In this manner, while the weight of the housing 24 can be substantially saved, it becomes easy to assemble the electric dynamo 11 by engaging the small diameter portion 33b of each support post 33 or the portion 331b to 333b corresponding to the small diameter portion 33b with the corresponding fragment of the stator core 23a as divided into six at the center of the outer peripheral surface of the fragment of the stator core 23a in the peripheral direction.

While the foregoing explanation is directed to the case where the support posts 33 and 331 to 333 are provided with cylindrical portions, i.e., the portions 33a, 331a, 332a and 333a, which do not engage a fragment of the stator core 23a. However, the support posts may be provided with a square rod as the engaging portions. Also, even if the portions are cylindrical, the support posts 33 and 331 to 333 may have an elliptic cross section rather than a perfect circular cross section across the longitudinal direction.

The electric dynamo 11 is not limited to the case where the stator core 23a divided into fragments each of which is supported by one of the support posts 33 and 331 to 333, but each fragment of the stator core 23a as divided is supported by two or more of the support posts 33 and 331 to 333. Alternatively, in the case where the fragments of the stator core 23a as divided are formed with convexo-concave sides and a plurality of fragments of the stator core 23a are joined by engaging the convexo-concave sides each other, one post of the support posts 33 and 331 to 333 may be connected to a plurality of fragments of the stator core 23a as divided the center of axis Returning to FIG. 3, the length L between the engaging portions, which are to engage the fragment of the stator core 23a when assembled, of the small diameter portions 33b of each pair of the support posts 33 diagonally located in relation to the center of axis O in advance of setting the respective fragments of the stator core 23a is slightly smaller than the outer diameter of the stator core 23a when the fragments of the stator core 23a as divided into six are assembled in the form of a cylinder.

Accordingly, when the small diameter portions 33b of the support posts 33 engage the stator core 23a, the support posts 33 are located extending outwardly (radially and outwardly from the center of axis O) from the virtual lines connecting the corresponding fixed positions of the pair of support plates 30a and 30b. Hence, when the fragments of the stator core 23a are fixed by means of the support posts 33, an reactive force is generate between the respective fragments of the stator core 23a and the support posts 33 to pressing each other and therefore no misalignment of the respective fragments of the stator core 23a occurs even through divided into six.

Furthermore, the small diameter portions 33b of the support posts 33 are formed with bolt holes 34. The fragments of the stator core 23a are radially and inwardly urged by means of bolts 35, and therefore more firmly fixed to the support posts 33. The pair of support plates 30a and 30b are formed with the steps 36a and 36b at the outer edge thereof with which the concentricity between the stator core 23a and the rotatable shaft 21 is assured when the support posts 33 are urged by the bolts 35 toward the center of axis O.

Meanwhile, while the stator core 23a is divided into the six fragments in the case of this embodiment, substantial weight saving and easy assembling can be achieved also by dividing the stator core 23a into at least three fragments.

Also, the housing 24 is not limited to the configuration including the pair of support plates 63a and 30b and the support posts 33 for connecting the pair of support plates 30a and 30b, as long as the rotatable shaft 21 and the stator 22 are surely supported. For example, it can be formed as a boxy casing structure, a framed structure or an appropriate structure in which an upper, a lower or a side surface is partially opened.

Figure 6:
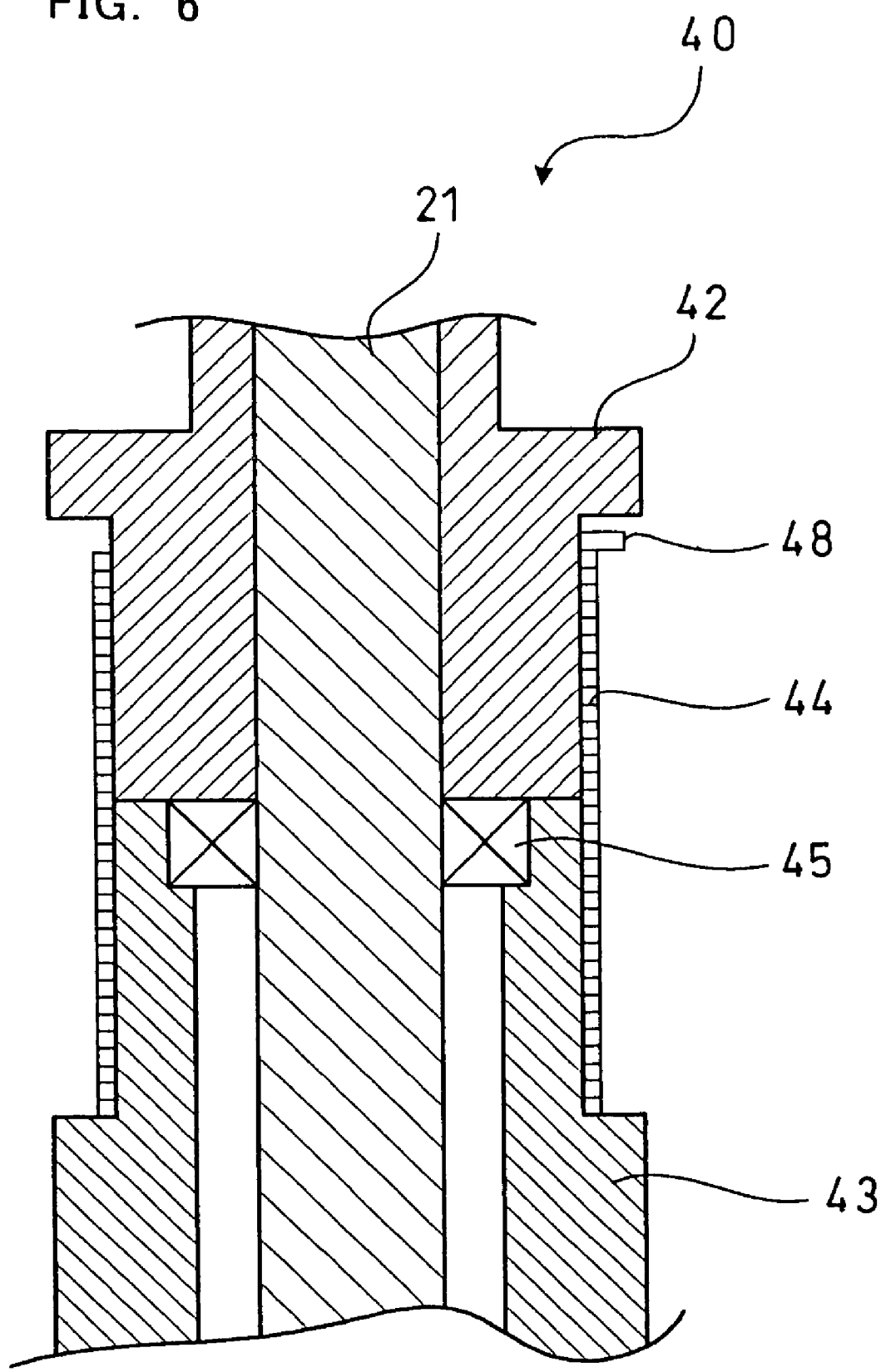
FIG. 6 is a vertical cross sectional view showing a spring device constituting the spring clutch in accordance with the preferred embodiment of the present invention.
Figure 7:
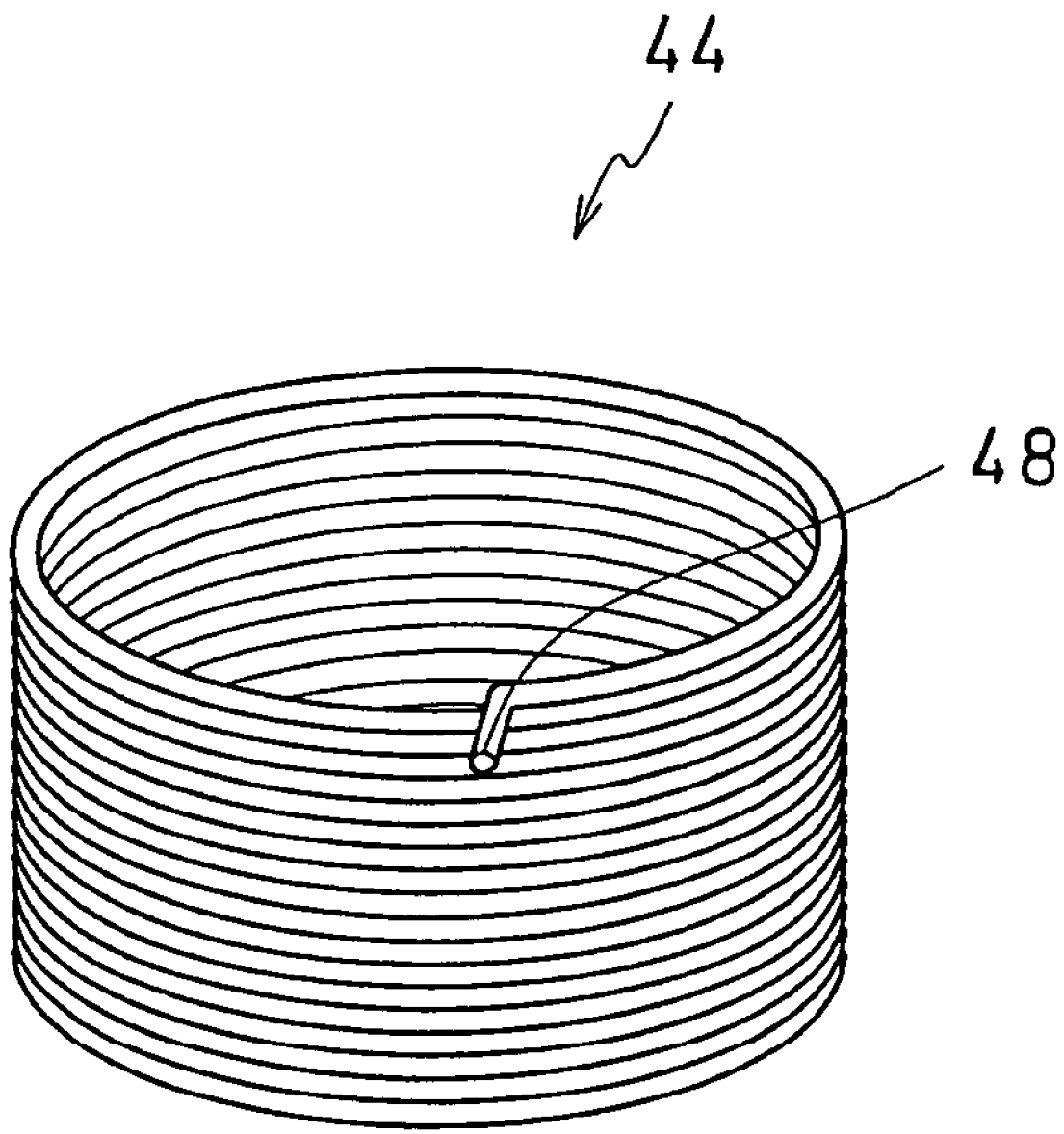
FIG. 7 is a perspective view showing the spring 44 constituting the spring device in accordance with the preferred embodiment of the present invention.
Figure 8:
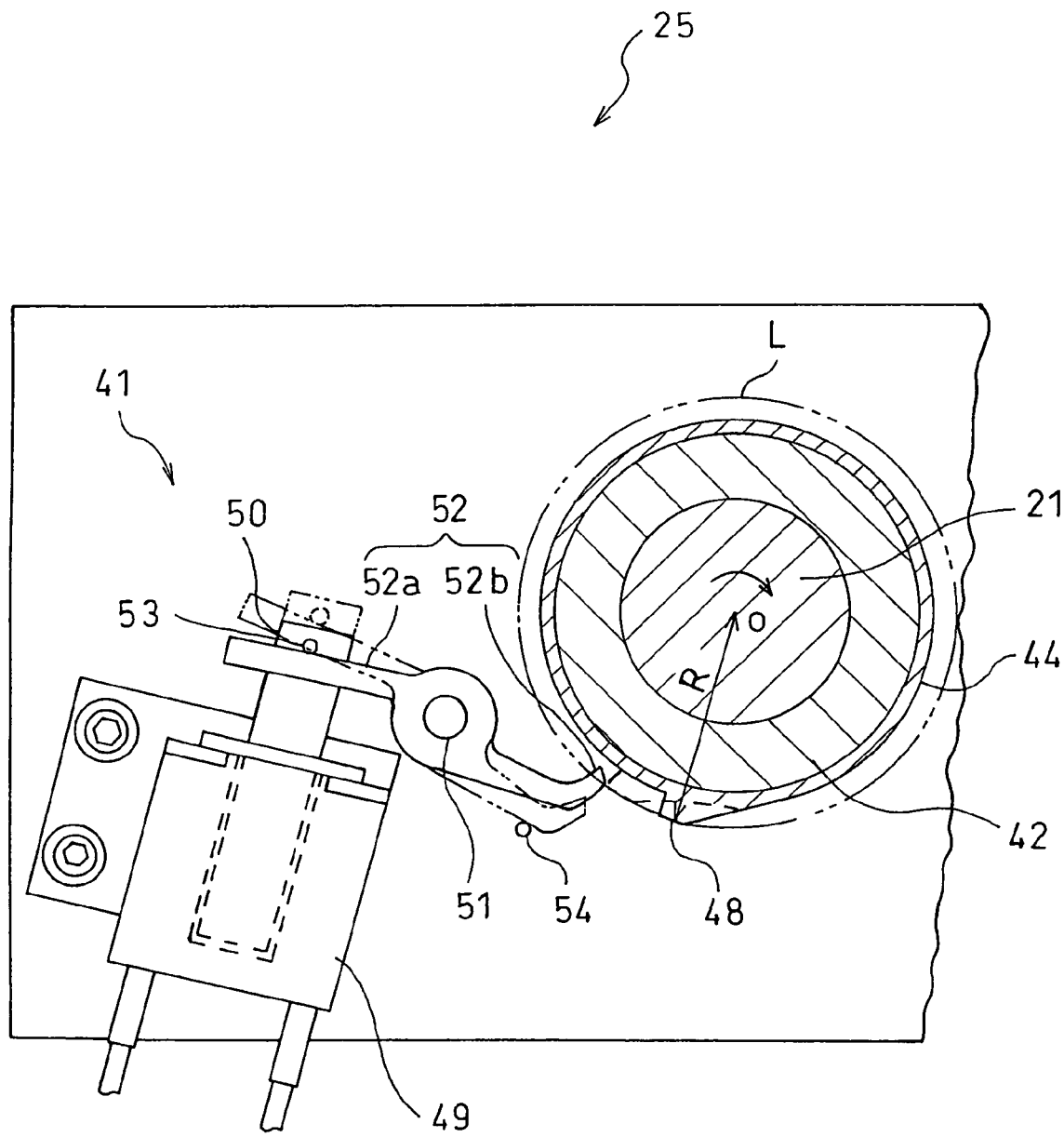
FIG. 8 is a plan view showing the spring clutch in accordance with the preferred embodiment of the present invention.

Next, the configuration of the spring clutch 25 will be explained with reference to FIG. 3, FIG. 6, FIG. 7 and FIG. 8. Here, FIG. 6 is a vertical cross sectional view showing a spring device 40 constituting the spring clutch 25 for use in the electric dynamo of the wind power electric generator according to the preferred embodiment of the present invention. FIG. 7 is a perspective view showing the spring 44 constituting the spring device 40 as shown in FIG. 6. FIG. 8 is a plan view showing the spring clutch 25 for use in the electric dynamo of the wind power electric generator according to the preferred embodiment of the present invention.

In FIG. 3, the spring clutch 25 is located between the rotatable shaft 21 and the rotator 22 in order to connect and disconnect the rotatable shaft 21 and the rotator 22. Hereinafter, it will be more specifically explained.

The spring clutch 25 is composed of the spring device 40 and a latch device 41.

In FIG. 6, the spring device 40 is composed of an input sleeve 42, an output sleeve 43 and the spring 44.

The input sleeve 42 receives at its hollow the rotatable shaft 21 by interference fit. Accordingly, when the rotatable shaft 21 rotates, the input sleeve 42 rotates integrally with the rotatable shaft 21.

The output sleeve 43 is fixed to the rotator 22 by bolts 47 as illustrated in FIG. 3. Accordingly, when the output sleeve 43 rotates, the rotator 22 rotates integrally with the output sleeve 43. In this manner, the rotator 22 and the output sleeve 43 as integrally fixed are rotatably supported on the rotatable shaft 21 through the shaft bearings 45 and 46 located inside thereof.

The spring 44 is a coil spring as illustrated in FIG. 7. One end of the spring 44 is formed with a projection 48 radially and outwardly projected from the spring 44.

Returning to FIG. 6, this spring 44 is fixed to the output sleeve 43 at the other end thereof opposite the one end having the projection 48, and fastened by screwing on the outer peripheral surfaces of the input sleeve 42 and the output sleeve 43 in the rotation direction of the rotatable shaft 21.

In FIG. 8, the latch device 41 is provided with a solenoid 49, a plunger 50, a spring pin 51 and an actuator 52.

The solenoid 49 serves to move backwards or forwards the plunger 50 in its longitudinal direction by electric controlling the solenoid 49 to perform magnetization or demagnetization thereof. Meanwhile, the plunger 50 as shown in FIG. 8 is in the position when the solenoid 49 is magnetized.

Also, while the plunger 50 is provided with a pin 53, the actuator is arranged with its arm 52a which engages the pin 53.

The actuator 52 is rotatably supported by the spring pin 51, as a supporting point, which urges the actuator 52 in the clockwise direction as seen in front of the drawing paper. That is, a force is always exerted on the actuator 52 in the clockwise direction as seen in front of the drawing paper, while the rotation in the clockwise direction is restricted by the stopper 54.

On the other hand, the rotatable shaft 21 rotates in the clockwise direction as seen in front of the drawing paper. When the rotatable shaft 21 rotates in the clockwise direction as seen in front of the drawing paper, the spring 44 is screwed on the outer peripheral surface of the input sleeve 42.

While the rotatable shaft 21 rotates, the projection 48 of the spring 44 moves in an orbit L around the center of rotation O as a supporting point with the length R between the center of axis O and the projection 48 as a radius. In this case, when the solenoid 49 is magnetized, the tip end portion 52b of the actuator is located to overlap the orbit L. On the other hand, when the solenoid 49 is in its demagnetized (non-excited) state, the tip end portion 52b of the actuator is located outside of the orbit L (i.e., in the opposite side to the center of axis O). Namely, the spring clutch 25 in accordance with the present embodiment is configured to engage in its non-excited state.

In this manner, it is possible to provide the wind power electric generator 1 having a simplified structure by locating the spring clutch 25 between the rotatable shaft 21 and the rotator 22. More specifically speaking, it becomes possible to support the rotator 22 on the rotatable shaft 21 in order that the rotator 22 can rotate in relation to the rotatable shaft 21. Accordingly, it is no longer requisite to separately provide the rotatable shaft 21 supporting the rotator 22 and the rotatable shaft 21 to which the windmill blades 10 are fixed through the supporting member 12 and becomes possible to provide the wind power electric generator main body 2 with the same axis. In the case of the wind power electric generator 1 according to this embodiment as explained above, there are substantial advantages, i.e., cost reduction, easy assembling and downsizing which can be achieved without need for a centering step during assembling.

Next, returning to FIG. 3, the rotational speed detector 26 for detecting the rotational speed of the rotatable shaft 21 will be explained. The rotational speed detector 26 is composed of a photoelectric sensor 60, and a plate-like detectable member 61 which is fixed to the rotatable shaft 21 and rotates when the rotatable shaft 21 rotates.

The photoelectric sensor 60 comprises a light emitting side from which an infrared ray is emitted, and a light receiving side which receives the infrared ray as emitted from the light emitting side. The detectable member 61 is fixed around the rotatable shaft 21 in order to pass between the light emitting side and the light receiving side of the photoelectric sensor 60 when the rotatable shaft 21 rotates.

When the detectable member 61 passes between the light emitting side and the light receiving side of the photoelectric sensor 60, the infrared ray as emitted from the light emitting side is intercepted by the detectable member 61 to generate a rotational speed signal which is pulses as output from the photoelectric sensor 60.

Alternatively, the rotational speed detector 26 may be an encoder. In such a case, the encoder outputs a rotational speed signal indicative of the number of pulses proportional to the rotational speed of the rotatable shaft 21 (the number of rotations per unit time). Furthermore, another detector may be employed as long as it can be used to calculate the rotational speed of the rotatable shaft 21.

Next, the brake system 27 will be explained with reference to FIG. 3. The brake system 27 is composed of an annular member 65a attached to the rotatable shaft 21, a pressing member 65b capable of contacting and departing from the outer peripheral surface of the annular member 65a, and a driving device 66 for moving the pressing member 65b backwards and forwards to the annular member 65a. And, when the pressing member 65b of the brake system 27 is urged against the annular member 65a by manipulating the driving device 66 by hand, the pressing member 65b serves to exert a large breaking force on the rotatable shaft 21 to completely stop the rotatable shaft 21. In this case, the pressing member 65b may be provided in order to directly press the rotatable shaft 21 while the annular member 65a is omitted.

Figure 9:
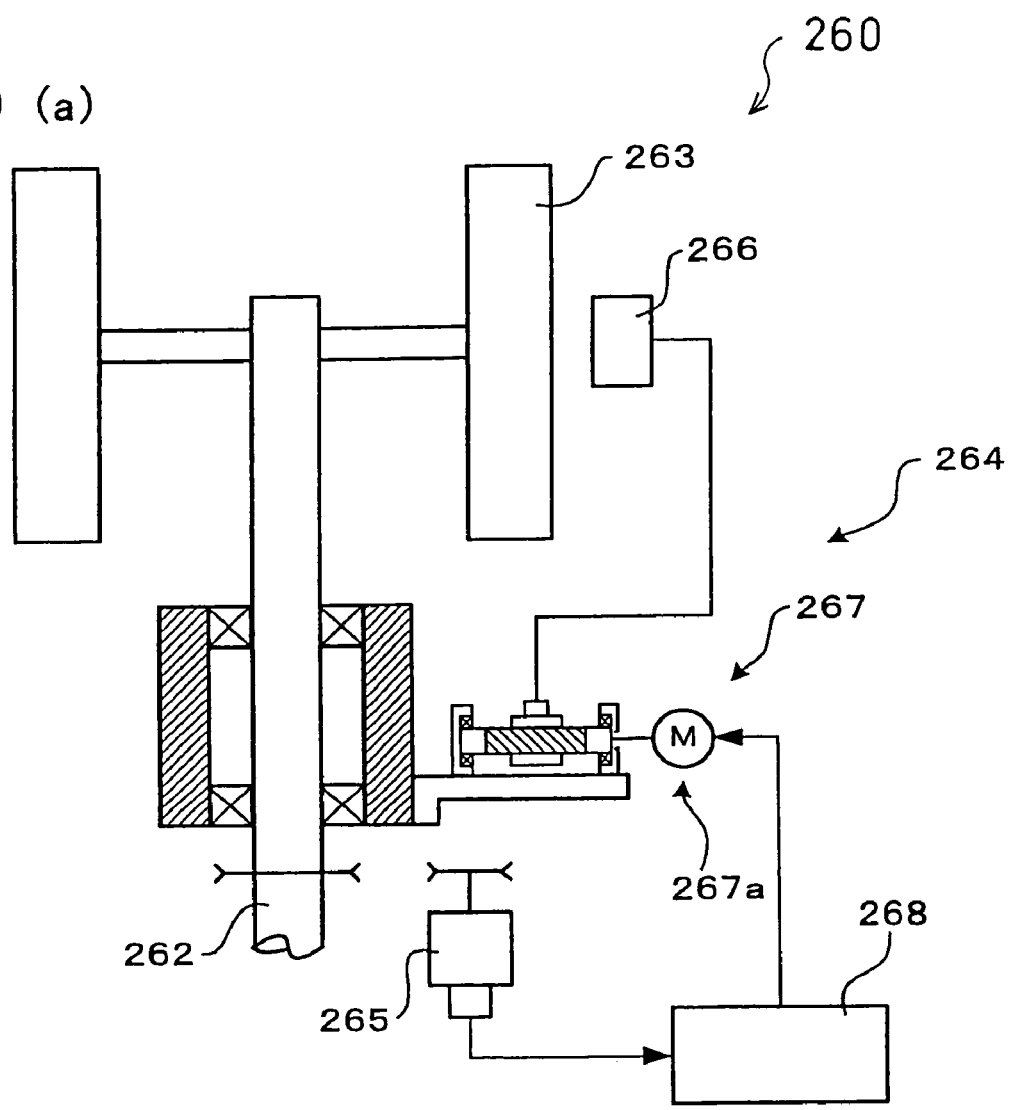
FIG. 9 is a view showing an embodiment with a unit capable of controlling the speed of the blades wherein (a) shows a speed reduction unit located outside of the blades and automatically operated; (b) shows the speed reduction unit as shown in (a) but manually operated; and (c) shows a speed reduction unit located under the rotatable shaft.
Figure 9:
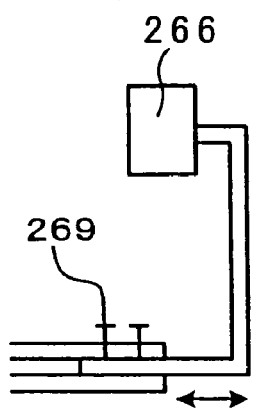
Figure 9:
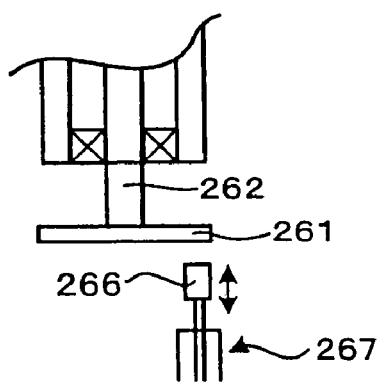
Figure 10:
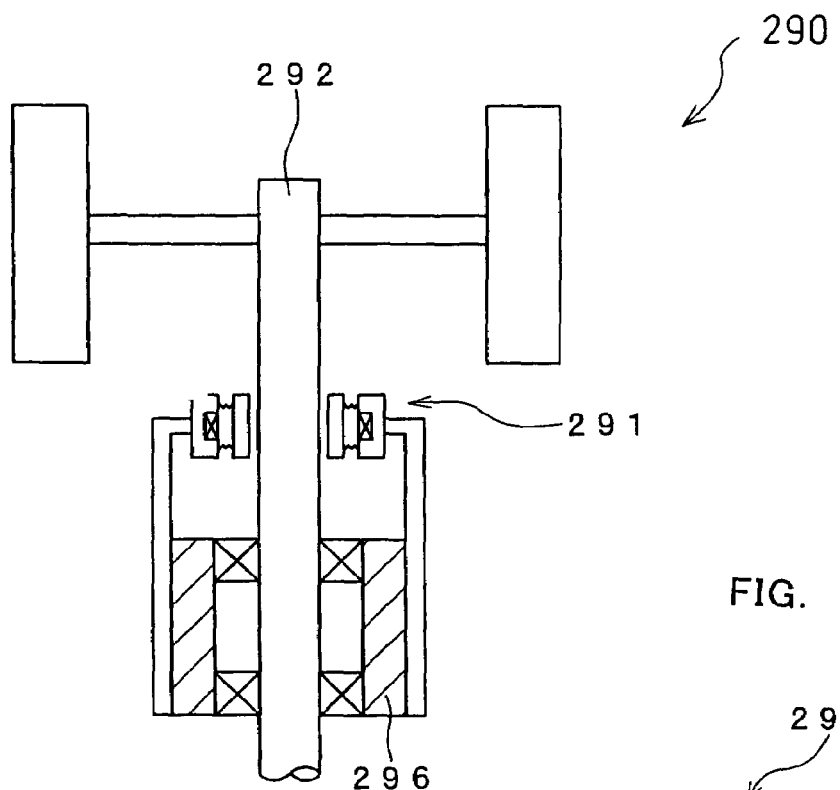
FIG. 10(a) is a view showing an exemplary embodiment capable of stopping the rotation of a rotatable shaft.
FIG. 10(b) is a view showing the mechanism of a rotation stop system for stopping the rotation of the rotatable shaft.
FIG. 10(c) is a view showing another exemplary embodiment capable of stopping the rotation of the rotatable shaft.
Figure 10:
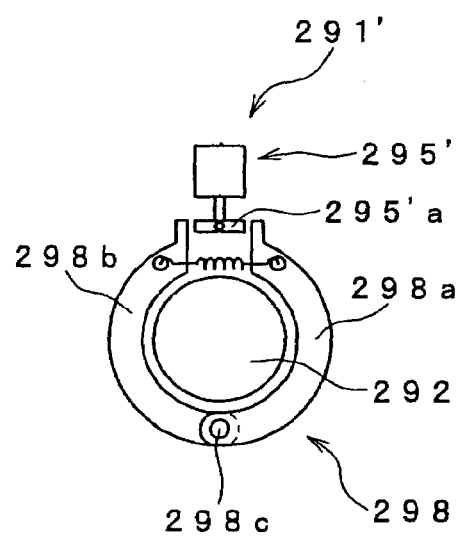
Figure 10:
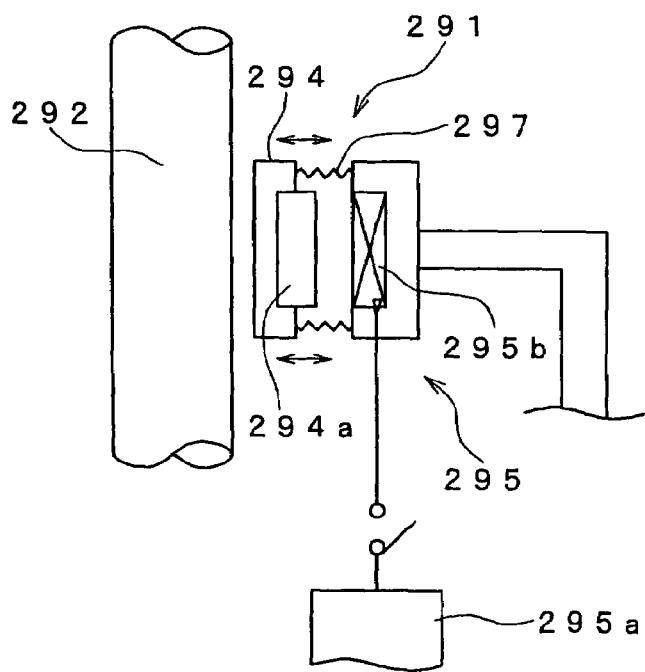

Also, the brake system 27 is not limited to this structure. For example, it is possible to use a brake system 264 or 291 as illustrated in FIG. 9 or FIG. 10. In what follows, the brake systems 264 and 291 as illustrated in FIG. 9 and FIG. 10 will be explained. Here, FIG. 9 is a view showing an embodiment with a unit capable of controlling the speed of the blades wherein (a) shows a speed reduction unit located outside of the blades and automatically operated; (b) shows the speed reduction unit as shown in (a) but manually operated; and (c) shows a speed reduction unit located under the rotatable shaft. In FIG. 10, (a) is a view showing one example of the embodiment capable of stopping the rotation of the rotatable shaft; (b) is a view showing the mechanism of a rotation stop system for stopping the rotation of the rotatable shaft; and (c) is a view showing another embodiment for stopping the rotation of the rotatable shaft.

Incidentally, in the explanation of the brake systems 264 and 291, other wind power electric generator main bodies 260 and 290 are used in place of the wind power electric generator main body 2 as explained above. However, this is only for the sake of explanation but does not mean that the brake systems 264 and 291 cannot be used in the wind power electric generator 1 as explained above. Also, the other wind power electric generator main bodies 260 and 290 are shown in FIG. 9 and FIG. 10 in which illustration of an electric dynamo is dispensed with.

FIG. 9 is a view showing a vertical axis type wind power electric generator provided with the system 264 capable of braking the rotation of blades. As illustrated in FIG. 9(a), the brake system 264 capable of braking the rotational speed of the blades 263 includes a plurality of the blades 263, a speed detecting unit 265 for detecting the rotational speed of the rotatable shaft 262, a system for advancing and retracting a magnet member 266 close to and apart from the blades 263 in accordance with the speed as detected, and a controller unit 268 for controlling a motor 267a which serves to drive this advancing and retracting system 267. Meanwhile, the plurality of the blades 263 are uprightly fixed to the rotatable shaft 262 in the peripheral direction.

By this configuration, when a strong wind such as a typhoon blows, the big windy condition is automatically detected followed by adjusting the distance between the magnet member 266 and the blades 263 to advance the magnet member 266 close to the blades 263 as a conductive member in whose surface an overcurrent is induced, resulting in a braking action. As a result, since an over speed is inhibited, the vertical axis type wind power electric generator is prevented from breaking down due to an excessive rotation.

In this case, the blades 263 may be formed as a conductive member in whole as described above, or only partially conductive corresponding to the magnet member. Also, while the embodiment as illustrated in FIG. 9(a) is automatically operated in emergency situations, the magnet member 266 may be provided in order to move backwards and forwards to the blades 263 by hand as illustrated in FIG. 9(b). In this case, the magnet member 266 is fixed with a bolt 269 or the like after moving. Alternatively, as illustrated in FIG. 9(c), it is possible to use a speed reduction unit having a disk 261 which is a conductive member fixed to the lower end of the rotatable shaft 262 with its central axis as concentrically aligned, and moving a magnet member 266 backwards and forwards.

FIG. 10(a) is a view showing a vertical axis type wind power electric generator provided with the system 291 capable of stopping the rotation of the rotatable shaft. FIG. 10(b) is a view showing the mechanism of the rotation stop system for stopping the rotation of the rotatable shaft. The rotation stop system 291 is fixedly supported on a cylinder 296 and composed of a friction plate 294 urged toward the rotatable shaft 292, a control system 295 for disabling or enabling the urging effect of this friction plate 294, and a spring 297 connected between the friction plate 294 and the control system 295.

The friction plate 294 is provided with a permanent magnet 294a in the side facing the control system 295. The control system 295 is provided with a coil 295b connected to an electric power source 295a in the side facing the permanent magnet 294a.

In the normal state, the permanent magnet 294 is attracted by the coil 295b and separated from the rotatable shaft 292. In an emergency, a current flows from the electric power source 295a through the coil 295b, and induces a magnetic flux canceling the magnetic flux of the permanent magnet 294. At this time, the friction plate 294 is pressed against the rotatable shaft 292 under the returning force of the compressed spring 297 to inhibit the rotation of the rotatable shaft 292.

In accordance with the above embodiment, there is an effect of protecting the system by stopping the rotation of the rotatable shaft 292, for example, in case of storm wind to avoid an excessive rotation and the occurrence of damage.

FIG. 10(c) is a view showing another example of the embodiment capable of stopping the rotation of the rotatable shaft. A rotation stop system 291' is composed of a friction cylinder 298 having friction half cylinders 298a and 298b pivotably connected to each other at their one ends by a joint 298c and linked to each other at their other ends by a spring 299, and a control system 295' for disabling or enabling the pulling force of this spring 299 by a cam 295'a.

In the normal state, the friction half cylinders 298a and 298b are temporarily fixed in order not to contact the rotatable shaft 292 by intervening the cam 295'a between the other ends of the friction half cylinders 298a and 298b. In an emergency, the cam 295'a is rotated between the other ends of the friction half cylinders 298a and 298b in parallel with the cross sectional plane of the rotatable shaft 292 by the control system 295'. The friction half cylinders 298a and 298b are then closed between their other ends to make the friction cylinder 298 contact the rotatable shaft 292 to stop the rotation thereof. However, this control system 295' is connected to its power source only in an unusual situation and disconnected therefrom in its normal state. In accordance with the above embodiment, there are similar advantages as in the embodiment as shown in FIG. 10(a).

Incidentally, any of the brake systems 27, 264 and 291 as described above can be configured to control the rotational speed of the rotatable shaft 21 either by hand or by automatic operation. Also, the number of the blades 10 or 263 of the wind power electric generator main body 2, 260 or 290 is arbitrary as long as the rotatable shaft 21, 262 or 292 can be rotated. Furthermore, any of the wind power electric generator main body 2, 260 or 290 as described above can be designed not only as a vertical axis type wind power electric generator but also as a horizontal axis type wind power electric generator.

Power Supply Equipment:

Next, the power supply equipment 3 will be explained with reference to FIG. 1, FIG. 2 and FIGS. 11 to 14. The power supply equipment 3 in accordance with the present embodiment comprises a controller 4 having a function of controlling the wind power electric generator main body 2 and a function of rectifying an AC power into a DC power, a manipulation display unit 5 for displaying and switching the operation state and the setting configuration of the wind power electric generator, a battery 6 for accumulating the DC power as rectified by the controller 4, an inverter 7 for converting the DC power accumulated in the battery 6 into an AC power and supplying the AC power to an external load 8, and an auxiliary battery charger 9 for supplying an auxiliary electric power to the battery 6.

In the case of the present embodiment, the electric dynamo 11 provided in the wind power electric generator main body 2 is an electric dynamo 11 for generating three-phase alternating currents. The electric dynamo 11 serves to output an AC power proportional to the rotational speed of the rotatable shaft 21. The output of the electric dynamo 11 is connected to a short-circuit brake system 75. The short-circuit brake system 75 is provided with short-circuit relays 76 connected to the respective terminal of the electric dynamo 11.

The short-circuit relays 76 open their switching nodes when energized by the controller 4 and closes their switching nodes when deenergized by the controller, and therefore the output terminals of the electric dynamo 11 are short-circuited in an unusual situation such as the failure of the controller 4. By this configuration, the short-circuit brake system 75 serves to brake the rotation of the rotatable shaft 21 with the windmill blades 10 by generating a large load on the electric dynamo 11.

The wind power electric generator main body 2 configured as described above is connected to the controller 4. As illustrated in FIG. 1, the controller 4 includes a control unit 80 for controlling the wind power electric generator 1, and a rectifying unit 81 for rectifying the AC power as output from the electric dynamo 11 of the wind power electric generator main body 2 into a DC power. The control unit 80 includes a rotational speed input section 82, a clutch drive section 83 and a short-circuit control section 84. The respective sections 82 to 84 are connected respectively to the rotational speed detector 26, the spring clutch 25 of the wind power electric generator main body 2 and the short-circuit brake system 75 as described above.

The rotational speed input section 82 has a function of converting the rotational speed signal detected by the rotational speed detector 26 into a format suitable for signal processing. The clutch drive section 83 has a function of controlling the operational condition of the spring clutch 25 by outputting a driving signal to the latch device 41 of the spring clutch 25, i.e., a function of magnetizing and demagnetizing the solenoid 49 as shown in FIG. 8. The short-circuit control section 84 has a function of making the electric dynamo 11 short-circuited in an unusual situation by outputting, during the normal operation, a driving signal to the short-circuit relays 76 of the short-circuit brake system 75.

Also, the controller 4 includes an auxiliary battery charger drive section 85, a battery charge control section 86, an inverter ON/OFF control section 87 and a manipulation display input/output section 88 as well as an arithmetic processing unit 90 for monitoring and controlling the respective sections 82 to 88. The details of the arithmetic processing unit 90 will be explained later.

Figure 11:
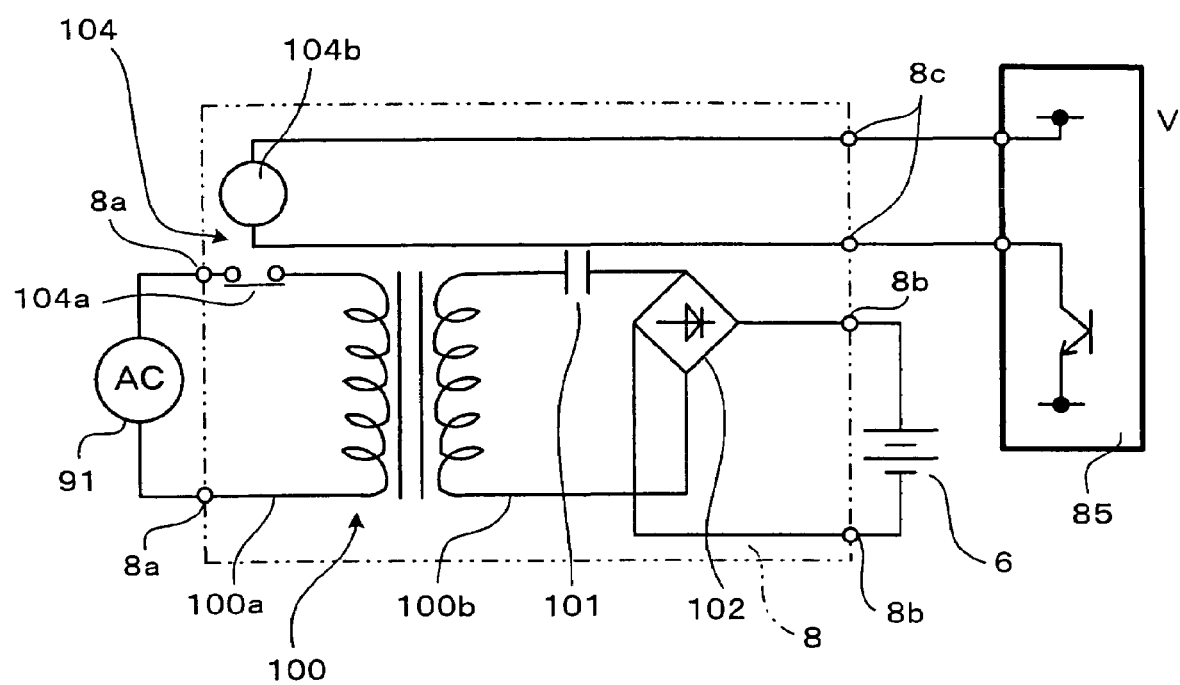
FIG. 11 is a block diagram showing an auxiliary battery charger for use in the wind power electric generator in accordance with the preferred embodiment of the present invention.

The auxiliary battery charger drive section 85 described above is connected to the auxiliary battery charger 9 called a DC power pack for charging the battery 6 with auxiliary power and serves to charge the battery 6 with auxiliary power when the battery 6 is not sufficiently charged by the wind power electric generator main body 2. The auxiliary battery charger 9 is implemented within one board or placed in the case as a built-in unit as illustrated in FIG. 11. The auxiliary battery charger 9 is provided with a power input terminal 8a, a power output terminal 8b and a signal input terminal 8c. An electric power supply 91 for commercial or industrial use is detachably connected to the power input terminal 8a. The battery 6 is detachably connected to the power output terminal 8b. The auxiliary battery charger drive section 85 is detachably connected to the signal input terminal 8c.

The above power input terminal 8a is connected to the primary coil 100a of a transformer 100. The secondary coil 100b of the transformer 100 is connected to a capacitor 101 for smoothing current and a bridge diode 102 for full-wave rectifying an alternating voltage. The bridge diode 102 has a cathod connected to the positive terminal of the battery 6 through the power output terminal 8b and an anode connected to the negative terminal of the battery 6 through the power output terminal 8b. By this configuration, the auxiliary battery charger 9 serves to charge the battery 6 after converting the AC power of the electric power supply 91 into a predetermined voltage by the transformer 100.

Also, the auxiliary battery charger 9 is provided with an auxiliary power relay 103. The auxiliary power relay 103 comprises a switching section 103a as a part of the electric current path including the primary coil 100a, and a coil 103b for opening and closing this switching section 103a. The switching section 103a is configured to open when the primary coil 103b is energized. Also, the primary coil 103b is connected to the auxiliary battery charger drive section 85 through the signal input terminal 8c. By this configuration, the auxiliary battery charger 9 functions to switchingly start and stop the auxiliary charge of the battery 6 in response to the control signal from the auxiliary battery charger drive section 85.

The battery 6 auxiliarly charged by the above auxiliary battery charger 9 is connected also to the rectifying section 81 of the controller 4 as illustrated in FIG. 1. The rectifying section 81 is configured to convert the AC power from the electric dynamo 11 of the wind power electric generator main body 2 into a DC power and to charge the battery 6 with the DC power.

That is, as illustrated in FIG. 2, the rectifying section 81 includes a bridge diode 102 connected to the output lines 11b, 11b and 11b of the electric dynamo 11 to rectify phase currents received from the electric dynamo 11 through the respective output lines 11b and output the rectified currents, a pair of charge capacitors 101 and 101 connected in series with each other and in parallel between the anode and the cathod of the bridge diode 102, a diode 105 connected in parallel with the bridge diode 102 in the same direction in the downstream side of the charge capacitors 101 and 101, a charge control section 106 provided between the diode 105 and the charge capacitors 101 and 101 and serving to switchingly allow or terminate the current flow therethrough, and a coil 107 provided in the downstream side of the diode 105.

Also, one end of the neutral line 108 is connected to the intermediate point 81a between the charge capacitors 101 and 101 of the rectifying section 81. The other end of the neutral line 108 is connected to the neutral point 11a of the electric dynamo 11. Then, with the neutral line 108, the rectified voltage after rectification can be obtained as a line voltage which is twice the phase voltage relative to the neutral point 11a of the three-phase alternating currents.

The above charge control section 106 comprises a semiconductor switch such as a transistor and is connected to the battery charge control section 86 as shown in FIG. 1. The battery charge control section 86 serves to control the power transfer time from the bridge diode 102 to the diode 105 by outputting a charge control signal. The rectifying section 81 as configured in this manner is connected to the battery 6 and the inverter 7 in order to charge the battery 6 with electric power corresponding to the power transfer time which is controlled by the charge control section 106.

Also, as illustrated in FIG. 1, the rectifying section 81 is composed of an electric dynamo voltage detector 110 for detecting the electric dynamo voltage of the AC power output from the electric dynamo 11, and a charging voltage detector 111 for detecting the charging voltage (battery voltage) of the battery 6. These voltage detectors 110 and 111 are connected to the arithmetic processing unit 90 and output the voltages as detected respectively to the arithmetic processing unit 90.

Also, the inverter ON/OFF control section 87 is connected to the arithmetic processing unit 90 in the same manner as the above battery charge control section 86, and connected to the inverter 7. The inverter 7 has an output function of converting the DC power accumulated in the battery 6 into an AC power for home use and outputting, for example, to the external load 8, and a function of switching between enabling and disabling the output function in response to the signal from the inverter ON/OFF control section 87.

Furthermore, the manipulation display input/output section 88 connected to the arithmetic processing unit 90 is also connected to the manipulation display unit 5. The manipulation display unit 5 is composed of a display area 120 such as a 7-segment LED and an LCD, and a display switch 121. The display area 120 is configured to display the operational condition of the wind power electric generator 1 with characters and numerals. Meanwhile, the operational condition includes a wind speed (the rotational speed of the rotatable shaft 21), the voltage of the electric dynamo, the charging voltage (battery voltage), the operating states of the respective units and sections and so forth.

Also, the display switch 121 is used to switch the display of the operational condition in the display area 120 by hand. Furthermore, the manipulation display unit 5 includes a control unit having a calculating unit, a storage unit and the like not shown in the figure. The control unit has a function of instructing the arithmetic processing unit 90 of the controller 4 to forward information about the predetermined operational condition, a function of instructing the arithmetic processing unit 90 to set the operation mode of the inverter 7 to the mode as selected by a mode changing switch, a function of selecting several functions of the arithmetic processing unit 90 to be executed and other functions in addition to the function of controlling the manipulation display unit 5 itself. Meanwhile, the respective functions of the manipulation display unit 5 can be implemented as hardware rather than as software. Also, the manipulation display unit 5 may be provided with a mode changing switch for manually switching between an output halting mode for halting the output of the inverter 7 when the charging voltage of the battery 6 falls below a predetermined value, and an output maintaining mode for always maintaining the output of the inverter 7.

Furthermore, the arithmetic processing unit 90 of the controller 4 also has a calculating unit and a storage unit which are not shown in the figure, as well as a variety of functions for controlling the wind power electric generator in the form of programs. Incidentally, the programs of the respective functions can be implemented as hardware rather than as software.

That is, the arithmetic processing unit 90 has an auxiliary charge processing function, an unusual operation control function, a rotation accelerating function, a low voltage charging function and so forth. The auxiliary charge processing function is a function of monitoring the charging voltage as detected by the charging voltage detector 111 and permitting the charge of the battery 6 with the auxiliary electric power by the auxiliary battery charger 9 when the charging voltage falls below a first predetermined value.

The unusual operation control function is a function of enabling the electric dynamo 11 to supply an AC power to the bridge diode 102 by energizing and opening the short-circuit relays 76 of the short-circuit brake system 75 in a normal operation, and generating a braking force to the electric dynamo 11 by short-circuiting the output of the electric dynamo 11 when power supply is halted due to an unusual operation. The rotation accelerating function is a function of releasing the spring clutch 25 from the rotatable shaft 21 in order to allow the free rotation of the rotatable shaft 21 disconnected from the rotor 22 when the rotational speed of the rotatable shaft 21 falls below a second predetermined value because of a low wind power. Then, when the rotational speed of the rotatable shaft 21 disconnected from the rotor 22 increases to a certain level, the function serves to recover the engagement between the spring clutch 25 and the rotatable shaft 21.

The low voltage charging function is a function of performing a charge control operation by switching the charge control section 106 between its "on" state and its "off" state when the rotational speed of the rotatable shaft 21 exceeds a third predetermined value, and maintaining the charge control section 106 in its "on" state when the rotational speed of the rotatable shaft 21 falls below the third predetermined value.

The operation of the wind power electric generator 1 having the above configuration will be explained. In a usual shutdown state, as illustrated in FIG. 2, the spring clutch 25 firmly engages the input sleeve 42 by stopping the energization of the latch device 41 of the spring clutch 25 which engages in its non-excited state. By this configuration, the rotatable shaft 21 and the rotor 22 are integrally connected by the spring clutch 25. Also, the electric dynamo 11 is short-circuited by stopping the energization of the short-circuit relays 76 of the short-circuit brake system 75. The electric dynamo 11 therefore stays in a state requiring a large force to rotate the electric dynamo 11. As a result, even in the case where a large rotational driving force is applied to the rotatable shaft 21 by wind power, a larger load is exerted as a braking force against the rotation of the rotatable shaft 21 when the rotatable shaft 21 rotates together with the rotor 22 at a higher speed, and therefore a high speed rotation of the rotatable shaft 21 is inhibited.

Furthermore, in an exceptional shutdown state, for example, with a strong wind or during a system check, the brake system 27, 264 or 291 generates a braking force against the rotatable shaft 21. The rotation of the rotatable shaft 21 is then completely stopped by fixing the rotatable shaft 21.

Next, when the operation is resumed, the controller 4 and the manipulation display unit 5 are powered up, if necessary, after the manipulation display unit 5 is connected to the controller 4. The controller 4 then energizes the latch device 41 of the spring clutch 25. The rotatable shaft 21 is therefore released from the spring clutch 25 and disconnected from the rotor 22. As a result, since the rotor 22 is placed in a freely rotatable state, the rotational speed of the rotatable shaft 21 can quickly increase even when a weak wind blows against the windmill blades 10. Also, the short-circuit brake system 75 is energized to release the electric dynamo 11 from its short-circuited condition and enable the electric dynamo 11 to supply the AC power generated by the electric dynamo 11 to the controller 4. On the other hand, the manipulation display unit 5 serves to display the operational condition of the control unit 80, i.e., such as the rotational speed of the rotatable shaft 21 with numerals and the like.

Next, the controller 4 serves to enable the arithmetic processing unit 90 to perform the auxiliary charge processing function, the unusual operation control function, the rotation accelerating function, the low voltage charging function and so forth.

Rotation Accelerating Function:

Specifically describing, the rotational speed of the rotatable shaft 21 is monitored. Then, when the rotational speed exceeds the second predetermined value plus a certain value, the energization of the latch device 41 of the spring clutch 25 is stopped to resume the engagement of the spring clutch 25. As a result, because of the inertia of the rotatable shaft 21, the rotor 22 starts to rotate integrally with the rotatable shaft 21 at a relatively high speed. Induction current is generated between the rotor 22 and the stator 23 located opposite the rotor 22 to supply the controller 4 with a high voltage AC power.

Also, when only a weak wind is available, the rotational speed of the rotatable shaft 21 decreases because of the load of the rotor 22 connected to the rotatable shaft 21. When the rotational speed of the rotatable shaft 21 falls below the second predetermined value, the energization of the latch device 41 of the spring clutch 25 is resumed. As a result, the rotatable shaft 21 is released from the spring clutch 25 to disconnect the rotatable shaft 21 from the rotor 22. In this condition, the rotational speed of the rotatable shaft 21 can quickly increase even with a weak wind. When the rotational speed of the rotatable shaft 21 exceeds a predetermined level, the spring clutch 25 engages the rotatable shaft 21 again. As a result, the rotatable shaft 21 is connected to the rotor 22 to resume the generation of electricity by the electric dynamo 11. It is thereby possible to intermittently supply the controller 4 with a high voltage AC power even with a weak wind.

Low Voltage Charging Function:

The AC power as supplied to the controller 4 as described above is full-wave rectified by the bridge diode 102, and then smoothed by a smoothing circuit composed of the charge capacitor 101, the diode 105 and the coil 107 to charge the battery 6 therewith.

Figure 12:
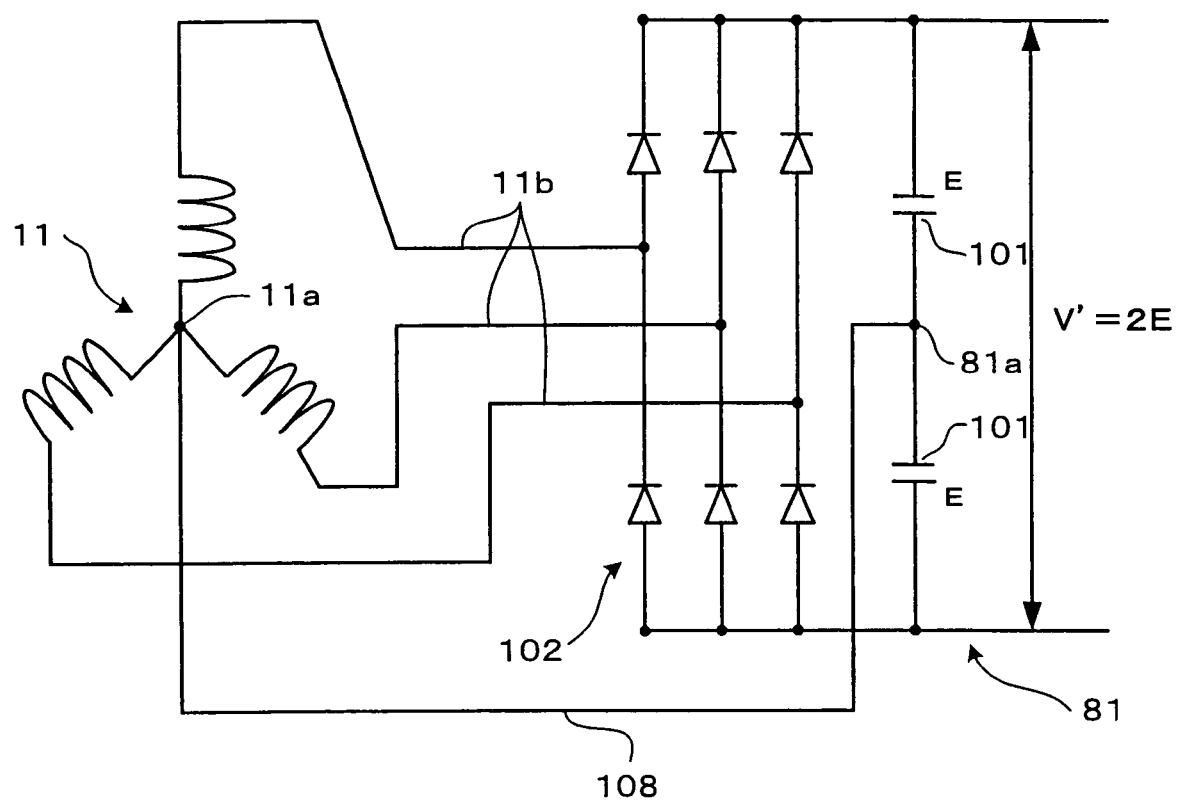
FIG. 12 is a circuit diagram showing from an electric dynamo to a rectifying section in the wind power electric generator in accordance with the preferred embodiment of the present invention.
Figure 13:
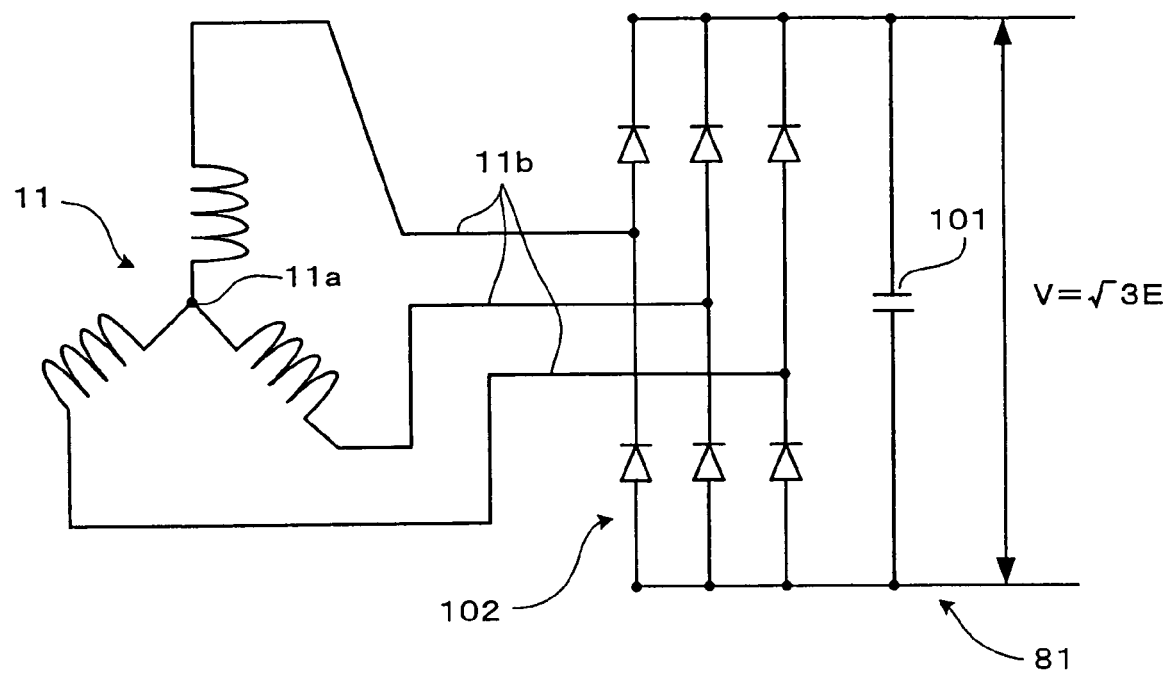
FIG. 13 is a circuit diagram showing from an electric dynamo to a rectifying section in a conventional wind power electric generator.
Figure 14:
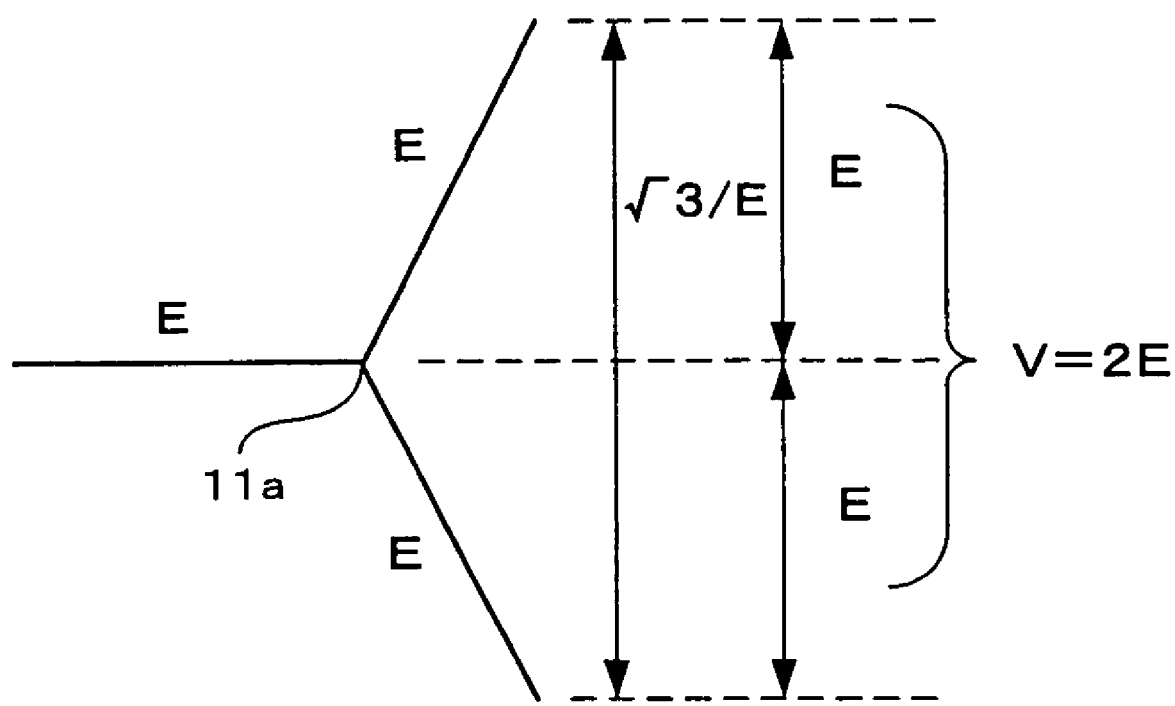
FIG. 14 is a view for explaining the charging voltage which is obtained from the rectifying section of the wind power electric generator in accordance with the preferred embodiment of the present invention.

In what follows, the charge process of the battery 6 will be explained in detail. As illustrated in FIG. 12, supplying an AC power to the controller 4 is performed by outputting the phase currents of the electric dynamo 11 to the bridge diode 102 through the respective output lines 11b. The phase currents input to the bridge diode 102 are full-wave rectified, and then supplied to the battery 6 while charging the charge capacitors 101 and 101. On the other hand, the voltage at the neutral point 11a of the electric dynamo 11 is applied to the intermediate point 81a between the charge capacitors 101 and 101 through the neutral line 108. By this configuration, as illustrated in FIG. 14, the respective charge capacitors 101 are charged and discharged with the rectified voltage obtained after rectification as a line voltage which is twice the phase voltage relative to the neutral point 11a of the three-phase alternating currents. As a result, the battery 6 is charged with a high voltage which is 1.15 times higher than that in the case of the circuit configuration as shown in FIG. 13 in which only the output lines 11b of the three phase alternating currents are used to obtain the rectified voltage after rectification as a line voltage which is $\sqrt{3}$ times the phase voltage. The battery 6 is effectively charged in this manner with electric power which is then utilized as the electric power source of the controller 4 and converted into an AC power by the inverter 7 to provide the external load 8 with an electric power source.

Also, the charging voltage and the charging current for charging the battery 6 are controlled by the charge control section 106. That is, when the rotational speed of the rotatable shaft 21 exceeds the third predetermined value, it is judged that the battery 6 is charged with an excessively high charging voltage as compared with the rated voltage of the battery 6, and therefore the charging process is controlled by switching the charge control section 106 between its "on" state and its "off" state in order to lower the charging voltage. On the other hand, when the rotational speed of the rotatable shaft 21 falls below the third predetermined value, it is judged that the battery 6 is charged with a charging voltage near the rated voltage of the battery 6, and therefore the charging process is controlled by maintaining the charge control section 106 in its "on" state.

Auxiliary Charge Processing Function:

Also, during charging the battery 6, the charging voltage as detected by the charging voltage detector 111 is monitored. When the charging voltage falls below the first predetermined value, it is allowed to charge the battery 6 with the auxiliary electric power by the auxiliary battery charger 9.

Namely, as illustrated in FIG. 11, when the charging voltage exceeds the first predetermined value, the switching section 103a is opened by the energization of the auxiliary power relay 103 to inhibit the auxiliary charge of the battery 6. On the other hand, when the charging voltage falls below the first predetermined value, it is judged that the charging voltage (battery voltage) of the battery 6 excessively drops, and the energization of the auxiliary power relay 103 is stopped. The deenergized auxiliary power relay 103 changes the switching section 103a from its open state to its closed state. An AC power is therefore supplied from the electric power source 91 to the transformer 100 which then generates a predetermined voltage therefrom, followed by generating an auxiliary electric power as smoothed by the capacitor 101. Finally, the battery 6 is auxiliarly charged by this auxiliary electric power. Incidentally, the charging current of the battery 6 is determined by I=ωCE, where ω=2 πF; C is the capacitance value μF of the capacitor 101; and E is the charging voltage. Also, even if the controller 4 becomes inoperative as a result of an excessive decrease in the charging voltage of the battery 6, the auxiliary power relay 103 is deenergized so that the battery 6 is auxiliarly charged by the auxiliary battery charger 9.

Unusual Operation Control Function:

Also, as illustrated in FIG. 2, the short-circuit relays 76 of the short-circuit brake system 75 are opened during the normal operation of the wind power electric generator 1. The AC power of the electric dynamo 11 is supplied to the rectifying section 81 such as the bridge diode 102 to charge the battery 6. On the other hand, when the controller 4 is stopped because of an emergency such as the wear or damage of parts, all the output signals as output to the wind power electric generator main body 2 and the like are stopped. As a result, the short-circuit relays 76 of the short-circuit brake system 75 are deenergized to short-circuit the electric dynamo 11.

Also, if the spring clutch 25 is deenergized, since the spring clutch 25 is configured to engage in its non-excited state, the spring 44 is firmly screwed on the input sleeve 42 which is integrated with the rotatable shaft 21. By this configuration, the rotor 22 is integrally coupled to the rotatable shaft 21 by the spring clutch 25. The rotational speed of the rotatable shaft 21 is quickly reduced by the large load of the electric dynamo 11 which is short-circuited.

As explained above, the power supply equipment 3 in accordance with this embodiment comprises the electric dynamo 11 (electricity generating unit) that converts a natural energy into an electric energy to output the electric energy as an electric power in the form of three phase alternating currents; a bridge diode 102 (rectifier) for rectifying and outputting the phase currents from the electric dynamo 11; a pair of capacitors 101 and 101 provided at the output of the bridge diode 102 and connected in parallel with the bridge diode 102 and in series with each other; and the neutral line 108 connected to the intermediate point connecting the neutral point 11a of the electric dynamo 11 with the intermediate point between the charge capacitors 101 and 101.

In accordance with the above configuration, as illustrated in FIG. 14, the rectified voltage after rectification can be obtained as a line voltage which is twice the phase voltage relative to the neutral point 11a of the three-phase alternating currents, and therefore an electric power can be generated with a high voltage higher than that in the case of the circuit configuration in which only the output lines 11b of the three phase alternating currents are used to obtain the rectified voltage after rectification as a line voltage which is $\sqrt{3}$ times the phase voltage. As a result, it can be used even in the environment where only small natural energy is available.

Also, as illustrated in FIG. 2, the power supply equipment 3 has the battery 6 (accumulation unit) serving to charge the electric power as output from the bridge diode 102 for use in driving a variety of apparatuses. By this configuration, even in the environment where only small natural energy is available, it is possible to elevate the charging voltage for charging the battery 6 and make effective the charge.

Furthermore, in accordance with the present invention, the above power supply equipment 3 is implemented within the wind power electric generator 1. The wind power electric generator 1 can therefore be effectively used even in the environment where the wind power is largely fluctuating.

In this case, the variety of apparatuses include the controller 4 of the wind power electric generator 1 and, as the external load 8, an electrically-powered equipment such as a refrigerator, a heating and lighting equipment such as an electric lamp and an air conditioner, and so forth. The natural energy include wind power, a solar cell, hydraulic power, wave power and the like available in nature.

The programs for implementing the respective functions can be stored in a ROM as a storage unit for the read-only purpose, transferred as needed from a recording medium such as a CD to the storage unit, or downloaded through a communication line such as the Internet and written into the storage unit.

While the present invention is illustrated with the foregoing preferred embodiment, it is not limited thereto. It will be understood that various embodiments may be made without departing from the spirit and scope of the present invention. Furthermore, while there are described effects and advantages of the configuration of the present invention in conjunction with the present embodiment, these effects and advantages are only examples but do not limit the present invention.

For example, while the present embodiment is applied to the vertical axis type wind power electric generator, it is not limited thereto. For example, while the source of power is not limited to wind power, hydraulic power may be used instead. Also, the rotatable shaft may be either vertical or horizontal. Furthermore, the present invention is not limited to electric dynamos for electric generator but can be applied to electric motors. This is because rotating electric machines include electric dynamos for electric generator and electric motors. Accordingly, the present invention is applicable to any rotating electric machine, such as an electric dynamo for electric generator and an electric motor, as long as it is provided with a rotatable shaft, a rotator fixed to this rotatable shaft and a stator located opposite the rotator

INDUSTRIAL APPLICABILITY

It is possible to provide an electric generator making use of natural energy and a power supply equipment for use in this electric generator, and therefore to contribute to solving environmental issues.

What is claimed is:

1. An electric generator comprising:
   a rotatable shaft coupled to a torque generating side;
   a rotator rotatably connected to said rotatable shaft;
   a clutch provided between said rotatable shaft and said rotator, said clutch comprising:
   a spring having one end attached to the rotator, and
   a latch device engageable with the other end of said spring to engage or disengage said spring on the other end of said rotatable shaft;
   a housing for containing said rotatable shaft, said rotator and said clutch; and
   a stator fixed to said housing and located opposed to said rotator.

2. The electric generator as claimed in claim 1 wherein said rotatable shaft is provided with a detector that detects the rotational speed of said rotatable shaft.

3. The electric generator as claimed in claim 1 wherein said rotator is coupled with said rotatable shaft when the rotational speed of said rotatable shaft reaches a predetermined rotational speed.

4. The electric generator as claimed in claim 1 wherein a brake system is provided between said rotatable shaft and said housing to brake the rotation of said rotatable shaft.

* * * * *